United States Patent
Alvarez Rodriguez et al.

(10) Patent No.: US 11,221,727 B1
(45) Date of Patent: Jan. 11, 2022

(54) VISUAL INTERLOCKING BLOCK BASED PROGRAMMING METHOD AND SYSTEM

(71) Applicant: Avaya Management L.P., Santa Clara, CA (US)

(72) Inventors: Jose Fernando Alvarez Rodriguez, Galway (IE); David May, Galway (IE); Swapnil Parashar, Galway (IE); Brian Varley, County Mayo (IE)

(73) Assignee: Avaya Management L.P., Santa Clara, CA (US)

(*) Notice: Subject to any disclaimer, the term of this patent is extended or adjusted under 35 U.S.C. 154(b) by 0 days.

(21) Appl. No.: 17/014,816

(22) Filed: Sep. 8, 2020

(51) Int. Cl.
*G06F 3/00* (2006.01)
*G06F 3/0481* (2013.01)
*H04L 12/18* (2006.01)
*G06F 8/41* (2018.01)
*G06F 8/34* (2018.01)
*H04L 29/08* (2006.01)
*G06F 3/01* (2006.01)

(52) U.S. Cl.
CPC .............. *G06F 3/0481* (2013.01); *G06F 8/34* (2013.01); *G06F 8/41* (2013.01); *H04L 12/1813* (2013.01); *H04L 67/025* (2013.01)

(58) Field of Classification Search
CPC .................................................... G06F 3/0481
See application file for complete search history.

(56) References Cited

U.S. PATENT DOCUMENTS

| | | | |
|---|---|---|---|
| 6,381,611 B1* | 4/2002 | Roberge | G16H 10/60 707/797 |
| 7,676,387 B2 | 3/2010 | Childress et al. | |
| 9,002,770 B2 | 4/2015 | Gould | |
| 2004/0153446 A1* | 8/2004 | Castronova | G06F 3/0485 |
| 2006/0053382 A1* | 3/2006 | Gardner | G06F 3/0482 715/764 |
| 2015/0019174 A1* | 1/2015 | Kiff | G06Q 10/06 703/1 |
| 2016/0210268 A1* | 7/2016 | Sales | G06F 3/04842 |
| 2016/0359680 A1* | 12/2016 | Parandehgheibi | G06F 3/0482 |
| 2017/0206242 A1* | 7/2017 | Djordjevic | G06F 16/248 |
| 2018/0196788 A1* | 7/2018 | Grigorovitch | G06F 40/106 |
| 2018/0262573 A1* | 9/2018 | Przybylski | G05B 15/02 |
| 2019/0095395 A1* | 3/2019 | Piecko | G06F 16/2457 |
| 2020/0210152 A1* | 7/2020 | Mimlitch, III | G06F 8/33 |

* cited by examiner

*Primary Examiner* — Nicholas Augustine
(74) *Attorney, Agent, or Firm* — Sheridan Ross P.C.

(57) ABSTRACT

Methods and systems are provided for creating and editing a visual interlocking block based program in a collaborative communication session. The visual interlocking block based program utilizes a single-page interface divided into an available segments region and a workspace region. Users drag visual program blocks from the available segments region into the workspace region in forming a visual program. The visual program blocks automatically interlock with one another in a pipeline to form an ordered sequence of visual program blocks making up the visual program. Each visual program block includes an icon that defines a specific programming function for a particular type of the visual program block. When arranged in the ordered sequence of the pipeline, the icons of the visual program blocks align to form a hieroglyph that identifies the visual program, a functionality of the visual program, and execution speeds of the visual program.

20 Claims, 17 Drawing Sheets

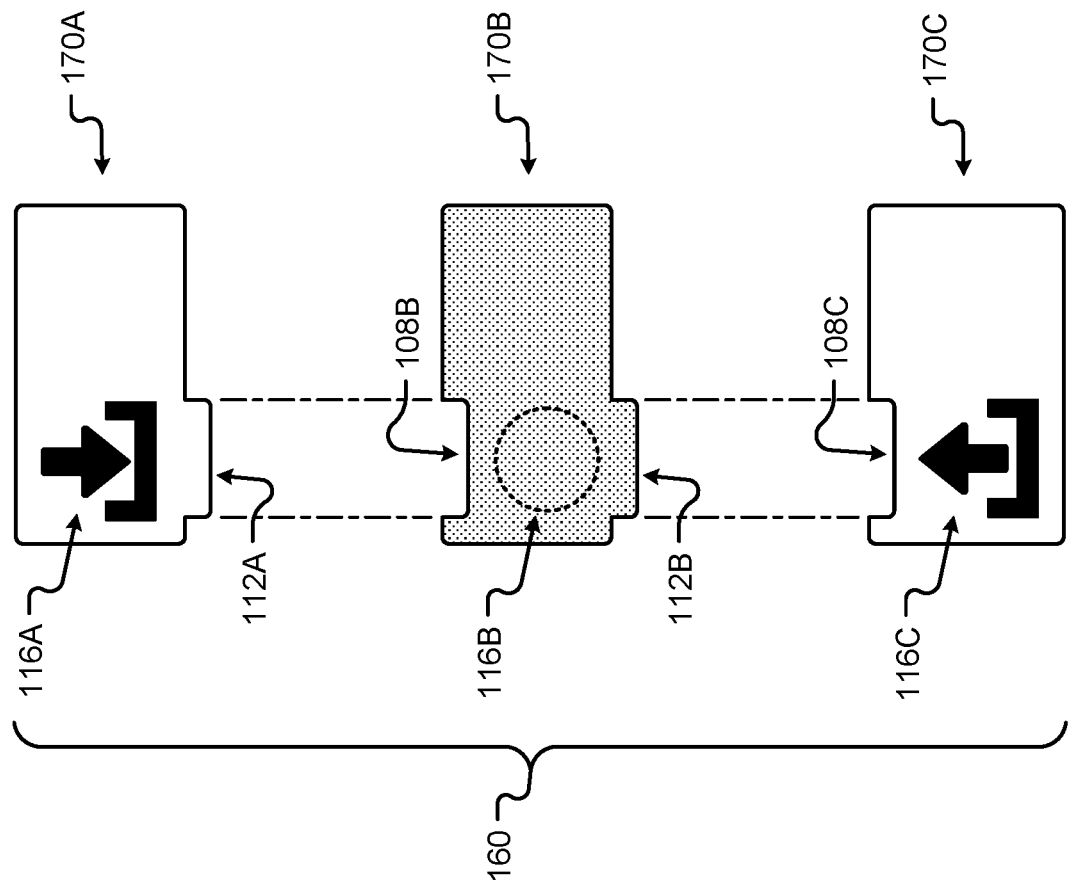
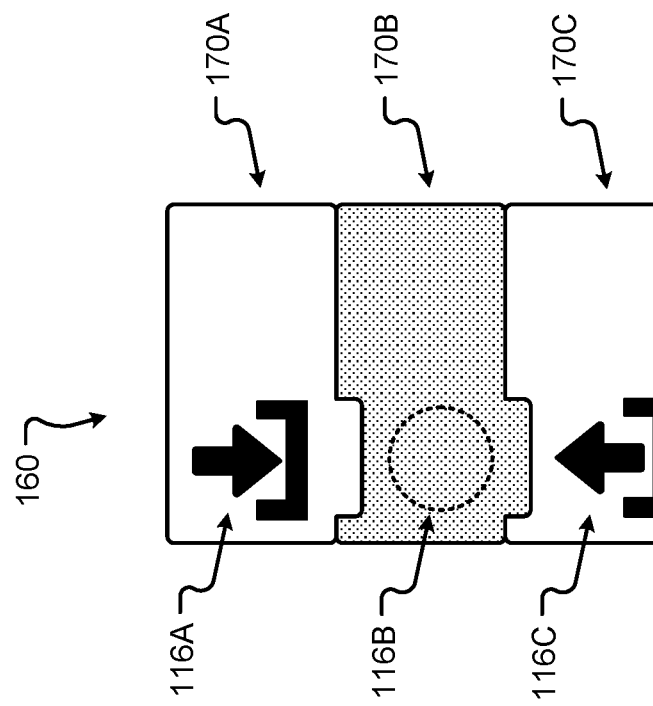

| Block Type | Function | IC | OC | Execution Speed |
|---|---|---|---|---|
| | Input | 0 | 1 | N/A |
| | Pump | 1 | 1 | Fast |
| | Custom | 1 | 1 | Fast |
| | SQL | 1 | 1 | Fast |
| | Data | 1 | 1 | Slow |
| | Split | 1 | 2 | Medium |
| | Splice | 2 | 1 | Medium |
| | Output | 1 | 0 | N/A |

| Label | Conditions | | | | Output | |
| --- | --- | --- | --- | --- | --- | --- |
| | C1 | C2 | C3 | ... | CN | Key | Value |
| Label1 | text | interval | number | | date-time | Key1 | Value1 |
| Label2 | text | interval | number | | date-time | Key1 | Value2 |
| Label3 | text | interval | number | | date-time | Key2 | Value3 |
| Label4 | text | interval | number | | date-time | KeyN | ValueN |

| Label | Conditions | | Output | |
| --- | --- | --- | --- | --- |
| | AvailableAgents | CustomerImportance | Key | Value |
| WT1 | 0 | * | Action | WaitTreatment |
| WT2 | (0,5] | 1] | Action | WaitTreatment |
| Label3 | (0,5] | [2 | Action | Bridge |
| Label4 | (5 | * | Action | Bridge |

| Conditions | | | | | Output | |
|---|---|---|---|---|---|---|
| Label | Action | Customer-Importance | LevelOf-Patience | Favorite-Music | Key | Value |
| SilverWT1 | WaitTreatment | 1 | * | Pop | Song | Gangnam Style |
| SilverWT2 | WaitTreatment | [0,1] | * | * | Message | Busy |
| GoldWT1 | WaitTreatment | [2 | * | * | Message | Please wait. |
| GoldWT2 | WaitTreatment | 2 | * | Rock | Song | Fortunate Son |
| PlatinumWT | WaitTreatment | 3 | * | Metal | Song | Walk |
| IntervalLong | WaitTreatment | * | 1 | * | Interval | 60 |
| IntervalShort | WaitTreatment | * | 2 | * | Interval | 10 |
| GoldBridge | Bridge | [0,3) | * | * | Agent | Donald |
| PlatinumBridge | Bridge | [3 | * | * | Agent | Scarlet |

| Label | Conditions ||||| Output ||
| | Action | Customer-Importance | LevelOf-Patience | Favorite-Music | | Key | Value |
|---|---|---|---|---|---|---|---|
| SilverWT1 | WaitTreatment | 1 | * | Pop | | Song | Gangnam Style |
| GoldWT2 | WaitTreatment | 2 | * | Rock | | Song | Fortunate Son |
| PlatinumWT | WaitTreatment | 3 | * | Metal | | Song | Walk |
| SilverWT2 | WaitTreatment | [0,1] | * | * | | Message | Busy |
| GoldWT1 | WaitTreatment | [2 | * | * | | Message | Please wait. |
| IntervalLong | WaitTreatment | * | 1 | * | | Interval | 60 |
| IntervalShort | WaitTreatment | * | 2 | * | | Interval | 10 |
| GoldBridge | Bridge | [0,3) | * | * | | Agent | Donald |
| PlatinumBridge | Bridge | [3 | * | * | | Agent | Scarlet |

716

VISUAL INTERLOCKING BLOCK BASED PROGRAMMING METHOD AND SYSTEM

BACKGROUND

The present disclosure is generally directed to visual programming systems, in particular, toward generating complete visual programs using interlocking graphical elements.

Many programming languages, especially visual programming languages, require extensive training and expertise to master the associated textual and visual components. For instance, most programming languages rely on a very specific vocabulary (e.g., keywords, named functions, preprocessor directions, etc.) that are associated with a particular programming language to write a complete working program. In addition to the language-specific vocabulary, conventional programming languages require special punctuation, complex structures, and ordered arrangements of elements to predictably perform a set of actions or functions.

Typical programs can only be read by a computer and not by a person. This shortcoming, among other things, prevents a multitude of users from being able to easily access and review the functions of a computer program (e.g., by examining the code making up the program, etc.). Moreover, these users may be unable, or unwilling, to attempt to edit an existing computer program (e.g., by adding/removing functions, altering commands, or customizing a program to suit a new problem, etc.) where extensive training in a particular programming language is required. Because there are thousands of programming languages in use today, deciding which programs to learn, or implement, can be difficult, time consuming, and limiting.

BRIEF DESCRIPTION OF THE DRAWINGS

FIG. 1C is a graphical representation of a complete program formed using an ordered sequence of visual program blocks in accordance with embodiments of the present disclosure;

FIG. 1D is an exploded view of the complete program of FIG. 1C showing the interlocking features of each visual program block making up the complete program in accordance with embodiments of the present disclosure;

FIG. 2 is a graphical table illustrating visual program blocks and features used in in accordance with at least some embodiments of the visual interlocking block based programming methods and systems of the present disclosure;

FIG. 7A is a block diagram of a first decision table in accordance with at least some embodiments of the present disclosure;

FIG. 7B is a block diagram of a second decision table in accordance with at least some embodiments of the present disclosure;

FIG. 7C is a block diagram of a third decision table in accordance with at least some embodiments of the present disclosure;

FIG. 7D is a block diagram of the third decision table shown in FIG. 7C ordered by key type in accordance with at least some embodiments of the present disclosure.

DETAILED DESCRIPTION

Figure 1A:
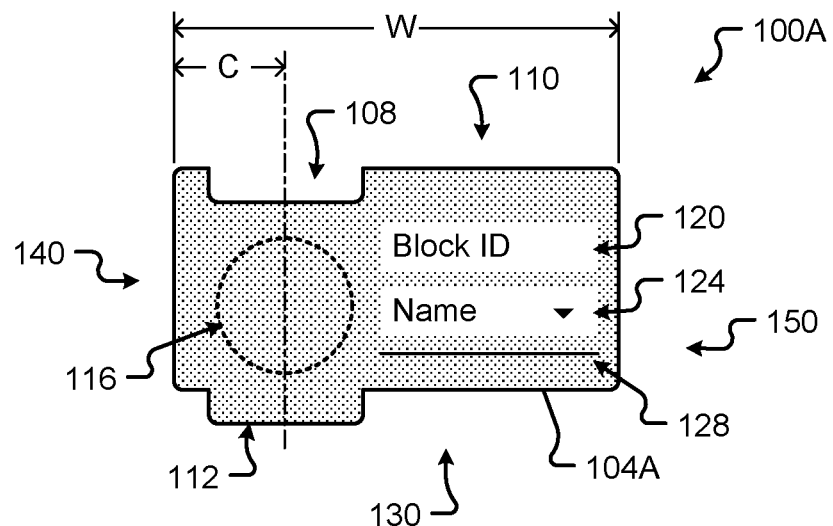
FIG. 1A is a graphical representation of a first visual program block used in accordance with at least some embodiments of the visual interlocking block based programming methods and systems of the present disclosure.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scope of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

Currently some of the scripts (e.g., list of computer program commands, etc.) implementing business rules can be hundreds, and sometimes thousands, of lines long of scripting languages (e.g., Groovy, Python, Perl, etc.). While the scripts are very powerful, the scripts are also extremely hard to maintain. In some cases, a dedicated team of programmers trained in the associated scripting, or programming, language may be required to maintain these scripts.

It is with respect to the above issues and other problems that the embodiments presented herein were contemplated. It is an object of the present disclosure to provide a visual programming language that reduces the complexity in the creation, visualization, and understanding of programs and/or scripts (e.g., business rules, etc.). The visual programming language (e.g., the visual interlocking block based programming methods and systems) described herein addresses the issues outlined above by, among other things, making rules creation accessible to nontechnical people. Additionally or alternatively, the decision-making process of the visual interlocking block based programming methods and systems described herein are easy to visualize and to follow. In some embodiments, a single-window system is described that can be used with a variety of different programming languages to create a visual programming language usable by non-technical people. Moreover, the single-window system allows for real time collaboration across different geographical locations.

In some embodiments, the visual interlocking block based program language (e.g., methods and systems, etc.) may be referred to herein as "Hieroglyph." For example, each visual program block may include an icon that defines a specific programming function associated with a respective visual program block. When arranged as an ordered sequence of visual program blocks, the complete program may comprise a series of aligned icons. The ordered sequence of visual program blocks and their respective icons may appear as a type of hieroglyph that defines the overall functionality of the complete program.

The terms "program," "visual program," "visual interlocking block based program," and "Hieroglyph program," may be used interchangeably herein to refer to any program, or portion of a program, comprising a plurality of interlocked (e.g., interconnected) visual program blocks. The term "complete program" and "completed program," as used herein, may refer to a visual program comprising an ordered sequence of visual program blocks comprising an input block, at least one intermediate block, and an output block and forming an operable program that processes one or inputs through the ordered sequence of visual program blocks and provides a program output. In some embodiments, the term "partial program" may refer to a visual program that is unfinished and/or absent at least one of the input block, the at least one intermediate block, and the output block forming the complete program. The term "pipeline" may be used herein to refer to a series of interlocked, or connected, visual program blocks. Depending on the context, a pipeline may refer to a complete program or a partial program. In some embodiments, the pipeline may define a structure of the visual program running from a first, highest, position (e.g., input block), through one or more subsequent lower positions (e.g., intermediate blocks), and ending with a last, lowest, position (e.g., output block).

Hieroglyph may be defined as comprising two major elements, namely, pipelines and blocks. Blocks may correspond to "black boxes" that can be made of decision tables and or external elements including but not limited to databases of any kind (e.g., using Structured Query Language ("SQL"), NoSQL, etc.) and data lakes. Pipelines may comprise an ordered sequence of modules, or blocks, that always start with one or more input modules and end with an output module. Between the input and output modules there will be one or more processing modules and, optionally, one or more flow control modules. Processing modules may be color-coded to indicate an execution speed of a particular block (e.g., green, orange, red, etc.). Green-colored modules may be considered as fast executing and may correspond to exclusively in memory-based operations (e.g., containing no loops, etc.). Red-colored modules may be considered as not so fast (e.g., slower than green-colored modules, etc.) and can consist of external Application Programming Interface ("API") calls or scripting languages (e.g., Groovy, Python, Perl, etc., and/or any other scripting language) that may contain looped code. Flow control modules may be color-coded using an orange color and may be either one of conditional forking or flow merging. In some embodiments, the pipelines themselves do not provision modules for looping code.

Modules in a pipeline may add or modify values of parameters and values within the pipeline. An input module may inject parameters and/or variables into the pipeline. In some embodiments, a limited amount of input modules may be chosen through a dropdown menu within the module icon. In one embodiment, there may be only one kind of output module that replies to error-correcting code. In some embodiments, there may be several instances of an output module within the same pipeline. Flow control conditional modules may check for the existence and non-emptiness of one or more variables or parameters. If all of the variables or parameters are present and non-empty, flow continues on the left side of the module. Otherwise, flow may be detoured to the right side of the module. In some embodiments, Hieroglyph may arrange, or orient, faster modules on a left side of flow control module and pipeline. A flow control merge module may reunite a previously split pipeline flow. Splitting may have occurred by setting multiple inputs or a conditional module. In some embodiments, a pump module may do nothing (e.g., other than serve as a passthrough for data, etc.). The pump module may be used in those cases when a particular parameter may be missing and a conditional module is required to call another particular module. Additional, or alternative, modules/blocks that can be used as the visual program blocks in a complete visual interlocking block based program may be as described below.

A custom-code module may use the available parameters in an opinionated manner to make a query on a decision table to obtain additional parameters for the flow in the pipeline. Choosing the decision table may be done through a pull-down menu selectable within the defined area of a module, or block. Creating and using decision tables is described in greater detail herein. Every custom-code decision table may contain a version number. In some embodiments, the version may be selectable via the pull-down, or dropdown, menu, etc.

An API request module may perform a remote procedure call (e.g., RPC, REST, CRUD, etc.) request to an external system (e.g., source, etc.) in order to obtain parameters or variables that cannot be determined locally. API requests may be created on the spot and given a name to be reused later. Choosing an API request may be done through a pull-down menu within the module's icon. Each API request may contain a version number. The version may be selectable through a pull-down, or dropdown, menu within the module's icon (e.g., defined graphical area of the block, etc.).

An Elasticsearch request module may be a specific case of the API request module that performs a request to a datalake. Elasticsearch requests may be created on the spot and given a name to be reused later. Choosing an Elasticsearch request may be done through a pull-down menu within the module's icon. Every Elasticsearch request may contain a version number. The version may be selectable through a pull-down, or dropdown, menu within the module's icon.

An SQL request module may perform an SQL query against the tables contained in a local service data component. SQL queries may be created on the spot and given a name to be reused later. In some embodiments, SQL requests may reference any local table. In one embodiment, modification of data in the tables may be prevented through read-only privileges. Choosing an SQL request may be done through a pull-down menu within the module's icon. Every SQL query, or request, may contain a version number. The version may be selectable through a pull-down, or dropdown, menu within the module's icon.

In some embodiments, a scripting language module may be employed to ensure backward compatibility. The scripting language module may run a script (e.g., Groovy, Python, Perl, etc., and/or some other scripting language) for adding or modifying parameters and variables in the pipeline. These scripts may be given access to the existing parameters and variables in the pipeline. In some embodiments, the scripts may be created and named through a different part of the user interface. Choosing a script may be done through a pull-down menu within the module's icon. Every script may contain a version number. The version may be selectable through a pull-down, or dropdown, menu within the module's icon.

Decision tables may correspond to two-dimensional tables consisting in a set of inputs, known as conditions, that may be represented as columns and a set of outputs that may be represented as rows. Conditions may consist on matching strings, numbers, times and dates or intervals of numbers, times and dates. In some embodiments, intervals of strings in alphabetical order may not be considered but partial strings with wildcards may. Outputs, as described herein, may include key-pairs having a name and a value. Other types of modules not described herein may be used in accordance with embodiments of the present disclosure.

The embodiments offer a number of benefits and advantages over conventional programming languages, methods, and systems. For example, the blocks used in Hieroglyph may employ any programming language or code. Because the visual program blocks used in Hieroglyph may receive and/or output data in key-value pairs, the visual interlocking block based programming methods and systems do not depend on a common programming language between blocks. Stated another way, the visual interlocking block based programming methods and systems can use any combination of visual program blocks, utilizing any programming language, in forming a complete program and processing data. As can be appreciated, blocks can be written in a variety of computer languages and combined in an ordered sequence using Hieroglyph to form a complete, and functioning, program or script.

Additionally or alternatively, Hieroglyph describes a system that utilizes a single-window interface in creating and/or editing complete visual interlocking block based programs. The visual program blocks may be added to the pipeline and configured within the same window. This single-window interface allows multiple users to create, configure, and/or edit a pipeline in a collaborative environment (e.g., as part of an established collaborative communication session etc.).

In some embodiments, the single-window interface may be accessible via a browser application (e.g., running on a user's communication device, etc.). In one embodiment, the single-window interface may be provided, or hosted, by a collaboration server and each user may be connected to the collaboration server, across a communication network, over respective communication channels. The users may each have the ability to drag visual program blocks from an "available segments" portion of the single-window into a "workspace" portion of the single-window when creating a complete program and/or move or otherwise manipulate (e.g., rearrange, delete, remove, etc.) the visual program blocks in the workspace portion when editing/configuring the complete program. These online collaborative capabilities allow users in different geographical locations to collaborate in the editing of the complete program. Modifications on the rules pipeline may be handled through a message broker, etc.

In some embodiments, Hieroglyph may prevent rule combination (e.g., where rules reference other rules and become new rules, etc.). As can be appreciated, this behavior may become obscure and cryptic when allowed in conventional programming languages. In some embodiments, Hieroglyph blocks may be atomic and can be combined only within the pipeline, preventing rule combination. In some embodiments, Hieroglyph may not generate rules and may only make use of rules. Hieroglyph may use blocks based on machine learning, but may not provide the means for learning. Hieroglyph may be based on a key-value pair pipeline. The visual program blocks may take any of the key-value pairs present in the pipeline and produce new key-value pairs as outputs that get added to the pipeline. This approach makes Hieroglyph an easy-to-use programming language that is independent of whatever specific programming language used in the various visual program blocks. Additionally or alternatively, because the visual interlocking block based programming methods and systems are independent of any specific programming language associated with each block, the visual interlocking block based programming methods and systems described herein are extensible. New types of visual program blocks may be added as technology evolves.

The color-coding of the visual program blocks may offer additional benefits including, but in no way limited to, allowing users to determine where bottlenecks may visually exist in a pipeline. For instance, a user may quickly evaluate a complete program, review areas where red-colored visual program blocks exist and determine that these areas may correspond to a slowed area, or bottleneck, in the processing and execution speed for the complete program.

Figure 1B:
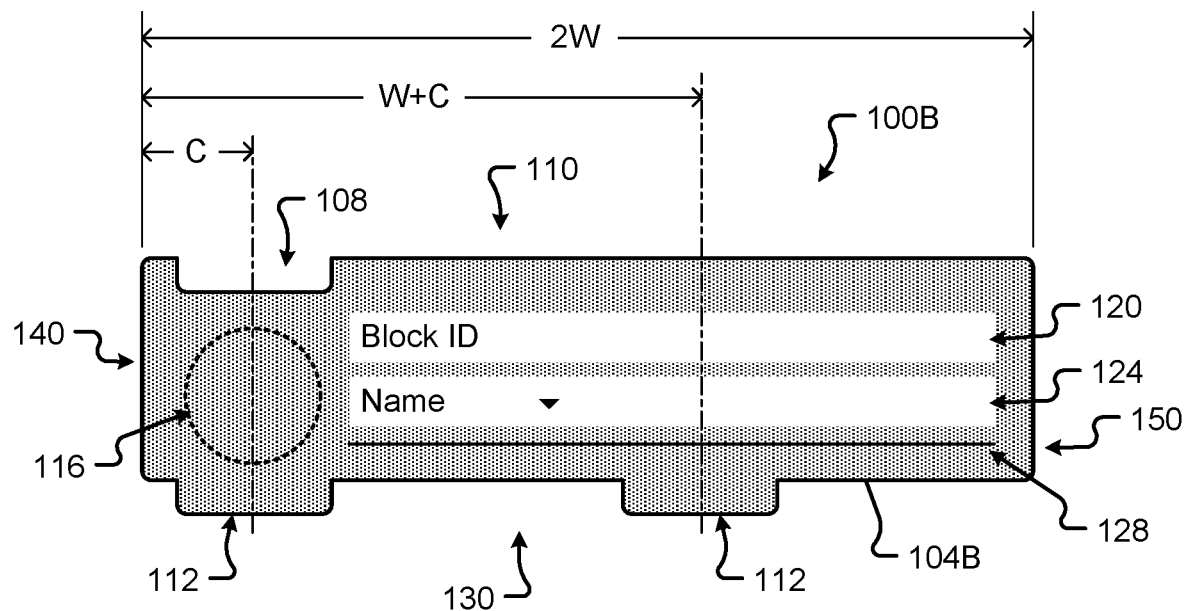
FIG. 1B is a graphical representation of a second visual program block used in accordance with at least some embodiments of the visual interlocking block based programming methods and systems of the present disclosure.

Referring now to FIGS. 1A-1B, graphical representations of visual program blocks 100A-100B used in the visual interlocking block based programming methods and systems are described. Each of the visual program blocks 100A-100B may comprise an outer shape 104A-104B, at least one input connection recess 108 disposed along an upper edge 110 and at least one output connection tab 112 disposed along the lower edge 130. The outer shape 104A-104B may encompass or surround a defined area. Inside the defined area, each visual program block 100A-100B may comprise an icon 116, a block type identifier 120, a specific programming function name 124, and/or a separator 128.

The outer shape 104A-104B of the visual program blocks 100A-100B may define a peripheral edge that encloses, or at least partially encloses, the defined area of the visual program blocks 100A-100B. As described herein, the defined area may be color-coded to, among other things, identify a processing or execution speed of the visual program blocks 100A-100B. As illustrated at least in FIGS. 1A-1B, the defined area of the visual program blocks 100A-100B are filled with a pattern that represents a color-coding. The lighter (e.g., lower density) fill pattern of the first visual program block 100A may indicate that the first visual program block 100A executes faster (e.g., in a shorter amount of time, etc.) than the second visual program block 100B having a darker (e.g., higher density) fill pattern. In some embodiments, the lighter fill pattern may correspond to a green color and the darker fill pattern may correspond to an orange fill pattern. Depending on the block type of the visual program blocks 100A-100B, the fill pattern may be changed to suit the execution speed of the block type. For example, the first visual program block 100A may be color-coded as slow (e.g., using a red color, etc.), medium (e.g., using an orange color, etc.), fast (e.g., using a green color, etc.), and/or some other execution speed using color combinations and/or variations for execution speeds therebetween, etc. Similarly, the second visual program block 100B, depending on the processing associated therewith, may also be color-coded as slow (e.g., using a red color, etc.), medium (e.g., using an orange color, etc.), fast (e.g., using a green color, etc.), and/or some other execution speed using color combinations and/or variations for execution speeds therebetween, etc.

Each of the visual program blocks 100A-100B may be sized to provide consistent interconnection and/or interlocking between one another. In one embodiment, the outer shape of the first visual program block 100A may correspond to a single-width outer shape 104A. Stated another way, the width, W, of the first visual program block 100A may extend from the left-hand side 140 to the right-hand side 150. The first visual program block 100A may correspond to a block that receives a single input (e.g., key-value pair, etc.) and produces a single output (e.g., key-value pair, etc.). The outer shape of the second visual program block 100B may correspond to a double-width outer shape 104B. The double-width outer shape 104B may have a width, 2 W, that is twice the width, W, of the single-width outer shape 104A.

The second visual program block 100B in FIG. 1B, is illustrated as a split block having a single input connection recess 108 and two output connection tabs 112. The single input connection recess 108 of the second visual program block 100B is shown in FIG. 1B as centered on the centerline offset the center distance, C, from the left-hand side 140 of the double-width outer shape 104B. A first one of the output connection tabs 112 is also centered on this centerline. However, the second one of the output connection tabs 112 is shown centered on a centerline that is offset a second center distance, W+C, that corresponds to the width of the single-width outer shape 104A plus the center distance, C. As can be appreciated, this arrangement of the output connection tabs 112 along the lower edge 130 of the double-width outer shape 104B allows two separate first visual program blocks 100A to be arranged side-by-side below the second visual program block 100B. In this arrangement, the first one of the output connection tabs 112 interconnects with the input connection recess 108 of a first one of the two separate first visual program blocks 100A and the second one of the output connection tabs 112 interconnects with the input connection recess 108 of a second one of the two separate first visual program blocks 100A.

When configured as a splice block (illustrated in FIG. 2), having two input connection recesses 108 (e.g., disposed along the upper edge 110 of the second visual program block 100B) and a single output connection tab 112 (e.g., disposed along the lower edge 130 of the second visual program block 100B), the single output connection tab 112 may be centered on the centerline offset the center distance, C, from the left-hand side 140 of the double-width outer shape 104B. A first one of the input connection recesses 108 may also be centered on this centerline. The second one of the input connection recesses 108 may be centered on the centerline that is offset the second center distance, W+C. This arrangement allows two separate first visual program blocks 100A to be arranged side-by-side above the second visual program block 100B (e.g., feeding input to each input connection recess 108 of the splice block). In this arrangement, the first one of the input connection recesses 108 interconnects with the output connection tab 112 of a first one of the two separate first visual program blocks 100A and the second one of the input connection recesses 108 interconnects with the output connection tab 112 of a second one of the two separate first visual program blocks 100A disposed above the second visual program block 100B.

The input connection recess 108 may correspond to a stylized edge or portion of an edge, indentation, slot, or other feature disposed along the upper edge 110 of the outer shape 104A-104B of the visual program block 100A-100B. As shown in FIGS. 1A-1B, the input connection recess 108 may comprise a recess, or an indented shape, that matches the shape of the output connection tab 112, and vice versa. Stated another way, the input connection recess 108 may be configured, or shaped, to interconnect with and receive the geometry of the output connection tab 112, and vice versa. The input connection recess 108 may serve as a connection point for one visual program block 100A-100B to the output connection tab 112 of another, preceding, block (e.g., a block that is placed in the pipeline vertically higher than the one visual program block 100A-100B. In some embodiments, a particular visual program block 100A-100B may not include the input connection recess 108. For instance, the input block described herein may not include the input connection recess 108 and may be arranged only with an output connection tab 112. In this example, the outer shape 104A of the input block may comprise an uninterrupted upper edge 110. An input block that serves as the beginning of a complete program (e.g., in a pipeline, etc.), or receives input from some other source, would not require the input connection recess 108 as no other block 100A-100B would precede the block in the program, or pipeline, in these cases.

The output connection tab 112 may correspond to a stylized edge or portion of an edge, protrusion, boss, extended or swollen portion, tab, or other feature disposed along the lower edge 130 of the outer shape 104A-104B of the visual program block 100A-100B. As shown in FIGS. 1A-1B, the output connection tab 112 may comprise a tab, or other shape, that extends from the lower edge 130 (e.g., in a direction away from the input connection recess 108 and the upper edge 110, etc.) and that matches the shape of the input connection recess 108, and vice versa. Stated another way, the output connection tab 112 may be configured, or shaped, to interconnect with and locate in the geometry of the input connection recess 108, and vice versa. The output connection tab 112 may serve as a connection point for one visual program block 100A-100B to the input connection recess 108 of another, subsequent, block (e.g., a block that is placed in the pipeline vertically lower than the one visual program block 100A-100B. In some embodiments, a particular visual program block 100A-100B may not include the output connection tab 112. For instance, the output block described herein may not include the output connection tab 112 and may be arranged only with an input connection recess 108. In this example, the outer shape 104A of the output block may comprise an uninterrupted lower edge 130. An output block that serves as the end of a complete program (e.g., in a pipeline, etc.), or a portion thereof, would not require the output connection tab 112 as no other block 100A-100B would follow the output block in the program, or pipeline, in these cases.

The icon 116 may be any image, graphic, logo, character, symbol, shape, and/or combination thereof, etc., that identifies the visual program block 100A-100B. For example, the icon 116 may serve to quickly identify and/or differentiate one visual program block 100A-100B from another used in the visual interlocking block based programming method and system. In some embodiments, separate icons may be used to define a specific type of script, function, partial program portion, block of code, and/or the like, associated with an input block, one or more intermediate blocks, and the output block. The icon 116 of each visual program block 100A-100B may be located in a specific portion of the defined area of the outer shape 104A-104B. For instance, the icon 116 may be disposed in a left-hand side of the defined area of the outer shape 104A-104B. As illustrated in FIGS. 1A-1B, the icon 116 may be centered vertically between the input connection recess 108 and the output connection tab 112 and may be offset from the left-hand side 140 of the outer shape 104A-104B by a center distance, C. In some embodiments, the center distance, C, may define the horizontal center of the icon 116. In one embodiment, this center distance, C, may correspond to the horizontal center of the input connection recess 108 and the output connection tab 112. When multiple visual program blocks 100A-100B are connected to one another (e.g., in a pipeline, or workspace, etc.) the icons 116 of each visual program block 100A-100B may align along a vertical centerline passing through the center distance, C, of each visual program block 100A-100B. This linear arrangement of icons may have the appearance of a hieroglyph, or an arranged stylized picture, that represents, or defines, the complete program formed by the multiple visual program blocks 100A-100B.

The block type identifier 120 may comprise a name, character, symbol, or string of characters that identifies the specific programming function of a particular visual program block 100A-100B. The block type identifier 120 may identify whether a particular visual program block 100A-100B is an input block, output block, or an intermediate block (e.g., arranged between the input block and the output block, etc.). Examples of the block type identifier 120 for an intermediate block may include, but are in no way limited to, a pump block, a custom-code block, an SQL block, a data lake block, a split block, a splice block, and/or some other block that processes or passes data between the input block and the output block of a complete visual program.

The specific programming function name 124 may comprise a name, character, symbol, or string of characters that identifies details about a chosen specific programming function of a particular visual program block 100A-100B. In some embodiments, the specific programming function name 124 may comprise a pull-down, or dropdown, menu selection icon (e.g., shown as a point-downward facing triangle) that, when selected, provides a list of programming options for the block type identified in the block type identifier 120. The list of programming options may define a behavior for the specific programming function of a visual program block 100A-100B. For example, when the first visual program block 100A is configured as an output block, the block type identifier 120 may display "Input Block." A user, via a user interface, may select the dropdown icon in the specific programming function name 124. When selected for the input block type, the user may be presented with a list including various types of output for selection. These types of outputs may include, but are in no way limited to, a uniform resource identifier ("URI"), "Error," and "Custom" output options. When a particular type of the output for the output block is selected, the specific programming function name 124 may list this name. As can be appreciated, the identification provided by the icon 116, the block type identifier 120, and/or the specific programming function name 124 allows users to quickly and easily identify the behavior and function of a visual program block 100A-100B simply by viewing the graphical representation of the block 100A-100B in a pipeline or completed visual program.

In some embodiments, the visual program blocks 100A-100B may comprise a separator 128 that separates the block type identifier 120 and/or the specific programming function name 124 from a remainder of the defined area of the visual program blocks 100A-100B. In one embodiment, this separator 128 may be configured as a horizontal line extending from a point adjacent to the icon 116 to a point adjacent to the right-hand side 150 of the visual program blocks 100A-100B. For the sake of clarity in description, the block type identifier 120, the specific programming function name 124, and/or the separator 128 of the visual program blocks 100A-100B illustrated in the following figures have been omitted from view. However, it should be appreciated that any type of the visual program blocks 100A-100B may include one or more of these features.

FIGS. 1C and 1D show various views of a complete program 160 formed using a plurality of the visual program blocks 100A-100B. FIG. 1C shows a graphical representation of a complete program formed using an ordered sequence of visual program blocks 100A-100B in accordance with embodiments of the present disclosure. FIG. 1D shows an exploded view of the complete program of FIG. 1C. Each complete program 160 requires an input block 170A, an output block 170C, and at least one intermediate block 170B disposed between the input block 170A and the output block 170C. Although shown as including an intermediate block 170B having a single-width outer shape 104A, it should be appreciated that the intermediate block 170B may include one or more visual blocks having the single-width outer shape 104A and/or the double-width outer shape 104B. The input block 170A has a first icon 116A corresponding to an input icon. As described above, the input block 170A may not include an input connection recess 108 and may only comprises an input block output connection tab 112A, as an interlocking connection. Additionally or alternatively, the output block 170C may not include an output connection tab 112 and may only include an output block input connection recess 108C, as an interlocking connection. The intermediate block 170B is shown including an intermediate block input connection recess 108B as well as an intermediate block output connection tab 112B.

When interlocked, the lower edge 130 of the input block 170A is shown contacting the upper edge 110 of the intermediate block 170B, the lower edge 130 of the intermediate block 170B is shown contacting the upper edge 110 of the output block 170C. Additionally or alternatively, the input block output connection tab 112A is shown disposed in the intermediate block input connection recess 108B and the intermediate block output connection tab 112B is shown disposed in the output block input connection recess 108C. In some embodiments, the interlocking of each block 170A-

170C in a complete program 160 may also be referred to herein as a "connection," an "interconnection," and/or a "docking," etc.

In one embodiment, forming or creating a complete program 160 may begin with the insertion of a input block 170A in a first position (e.g., a highest, or uppermost, position) in a pipeline rendered to a virtual workspace. Next, a first intermediate block 170B is interconnected with the input block 170A in a second position (e.g., at least one level, or position, lower than the first position) in the pipeline rendered to the virtual workspace. In some embodiments, additional intermediate blocks 170B may be interconnected with preceding intermediate blocks 170B (e.g., at subsequently lower levels, or positions, etc.). Once the desired arrangement of the intermediate blocks 170B is configured in the rendered virtual workspace (e.g., a desired processing of data, etc.), the user may insert an output block 170C at the end (e.g., the lowest, or lowermost, position) of the pipeline in the rendered virtual workspace to close, or end, the complete program 160. Once completed, the complete program 160 receives an input at the input block 170A, processes the input received at the intermediate block 170B, and provides an output at the output block 170C. The processing performed by the complete program 160 occurs on a level-by-level basis proceeding from the highest level (e.g., the input block 170A), through the middle levels (e.g., associated with the intermediate blocks 170B), to the lowest level (e.g., the output block 170C).

Referring to FIG. 2, visual program block graphics table 200 is shown illustrating different visual program blocks 100A-100B and associated features. Although eight types of visual program blocks 100A-100B are shown in the table 200, it should be appreciated that more or fewer block types may be employed in the visual interlocking block based programming methods and systems described herein. The visual program block graphics table 200 includes a block type image column 204, a programming function column 208, a number of input connections column 212, a number of output connections column 216, a function execution speed column 220, and more 224.

For each visual program block 100A-100B identified in rows 228-260 in the visual program block graphics table 200, the block type image column 204 may define a shape (e.g., an outer shape 104A-104B, arrangement of input connection recesses 108, arrangement of output connection tabs 112, widths, etc.), icon 116, and general appearance of a respective visual program block 100A-100B. The programming function column 208 may define the specific programming function, or script, associated with each block type identified in the block type image column 204. The number of input connections column 212 may identify the number of input connection recesses 108 that each block type has and the number of output connections column 216 may identify the number of output connection tab 112 that each block type has. The function execution speed column 220 may list an execution, or processing, speed associated with each block type identified in the block type image column 204. The execution speed may be based on a number of minutes, seconds, milliseconds, etc., to execute the code (e.g., and return a result, etc.) associated with a particular visual program block 100A-100B. In some embodiments, the execution speed may be a comparative speed with other visual program blocks 100A-100B. In one embodiment, the execution speed may determine a speed of a particular visual program block 100A-100B based on the code associated with the particular visual program block 100A-100B executing (e.g., returning a result, completing processing, etc.) falling within one or more predetermined thresholds. For instance, a "fast" execution speed may correspond to an execution speed that is, or takes an amount of time, between a first time value and a greater (e.g., longer) second time value. A "medium" execution speed may correspond to an execution speed that is, or takes an amount of time, greater than or equal to, the second speed and less than a greater (e.g., longer) third time value. A "slow" execution speed may correspond to an execution that is, or takes an amount of time, greater than or equal to, the third time value.

The input block row 228 shows a graphical representation of an input block in the block type image column 204. The function of the input block identified in the programming function column 208 is to receive and/or pass on an input. An input block may inject parameters and/or variables into the pipeline. There may be a limited amount of input blocks that will be chosen through a dropdown menu within the defined area of the block (e.g., the dropdown icon in the specific programming function name 124, etc.). The input block may not comprise an input connection recess 108 (e.g., indicated by the "0" in the number of input connections column 212) but may comprise a single output connection tab 112 (e.g., indicated by the "1" in the number of output connections column 216). As the input block either receives or passes an input, without processing, there may not be any execution speed associated with the input function and the input block. The execution speed in this instance may not be applicable as indicated by the not-applicable ("N/A") entry in the function execution speed column 220 of the visual program block graphics table 200.

The pump block row 232 shows a graphical representation of a pump block in the block type image column 204. The function of the pump block identified in the programming function column 208 is to pass, or pump, data through the block from a block attached to the input connection recess 108 of the pump block to a block attached to the output connection tab 112 of the pump block. In some embodiments, a pump block does nothing. It may be used only in those cases when a particular parameter may be missing and a conditional block is required to call another particular block. The pump block may be configured as a first visual program block 100A having a single-width outer shape 104A. The pump block may comprise a single input connection recess 108 (e.g., indicated by the "1" in the number of input connections column 212) and a single output connection tab 112 (e.g., indicated by the "1" in the number of output connections column 216). Because the pump block is configured to pass on, or pump through, data, there may only be a short execution speed, if any, associated with the pump function. The execution speed for the pump block may be defined as "Fast" in the function execution speed column 220 of the visual program block graphics table 200.

The custom-code block row 236 shows a graphical representation of a custom-code block in the block type image column 204. The function of the custom-code block identified in the programming function column 208 is to process any enterprise code, proprietary code, or other code, scripts, or functions. The custom-code block may use the available parameters in an opinionated manner to make a query on a decision table to obtain additional parameters for the flow in the pipeline. Choosing the decision table may be done through a dropdown menu within the defined area of the custom-code block. Creating and using decision tables is described in greater detail in conjunction with FIGS. 7A-7D below. In some embodiments, each decision table may contain a version number. The particular version of the decision table may be selectable through a dropdown menu within the defined area of the block (e.g., the dropdown icon in the specific programming function name 124, etc.). The custom-code block may be configured as a first visual program block 100A having a single-width outer shape 104A. The custom-code block may comprise a single input connection recess 108 (e.g., indicated by the "1" in the number of input connections column 212) and a single output connection tab 112 (e.g., indicated by the "1" in the number of output connections column 216). Because the custom-code block is configured to manipulate, process, or query locally available data and/or tables, there may only be a short execution speed associated with the custom-code function. The execution speed for the custom-code block is defined as "Fast" in the function execution speed column 220 of the visual program block graphics table 200.

The SQL block row 240 shows a graphical representation of an SQL block in the block type image column 204. The function of the SQL block identified in the programming function column 208 is to run SQL code, scripts, or functions. The SQL block may perform an SQL query against tables contained in a local service data component. In some embodiments, SQL queries may be created on the spot and may be given a name to be reused later. SQL queries and/or requests performed by the SQL block may reference any local table (e.g., any table stored in a local memory storage device, etc.). Modification of data in the tables may be prevented through read-only privileges. Choosing an SQL block's specific programming function may be done through a dropdown menu within the defined area of the block (e.g., the dropdown icon in the specific programming function name 124, etc.). In some embodiments, the SQL block's specific programming function may contain a version number. The particular version of the SQL block's specific programming function may be selectable through the dropdown menu within the defined area of the block. The SQL block may be configured as a first visual program block 100A having a single-width outer shape 104A. The SQL block may comprise a single input connection recess 108 (e.g., indicated by the "1" in the number of input connections column 212) and a single output connection tab 112 (e.g., indicated by the "1" in the number of output connections column 216). Because the SQL block is configured to manipulate, process, or otherwise query locally available data and/or tables, there may only be a short execution speed associated with the custom-code function. The execution speed for the SQL block is defined as "Fast" in the function execution speed column 220 of the visual program block graphics table 200.

The data lake block row 244 shows a graphical representation of a data lake block in the block type image column 204. The function of the data lake block identified in the programming function column 208 may be to run a script, function, or code that performs an Elasticsearch request of a data lake, etc. Choosing a data lake block's specific programming function may be done through a dropdown menu within the defined area of the block (e.g., the dropdown icon in the specific programming function name 124, etc.). In some embodiments, the data lake block's specific programming function may contain a version number. The particular version of the data lake block's specific programming function may be selectable through the dropdown menu within the defined area of the block. The data lake block may be configured as a first visual program block 100A having a single-width outer shape 104A. The data lake block may comprise a single input connection recess 108 (e.g., indicated by the "1" in the number of input connections column 212) and a single output connection tab 112 (e.g., indicated by the "1" in the number of output connections column 216). Because the data lake block is configured to perform a request to a data lake (e.g., from one or more external sources, etc.) the execution speed may be slower than the other functions associated with local data, etc. The execution speed for the data lake block is defined as "Slow" in the function execution speed column 220 of the visual program block graphics table 200.

The split block row 248 shows a graphical representation of a split block in the block type image column 204. The split block may be referred to herein as a flow control conditional module. The function of the flow control conditional module is to check for the existence and non-emptiness of one or more variables or parameters. If all of the variables or parameters are present and non-empty, flow may continue on the left-hand side of the block. Otherwise, flow may be detoured, or routed, to the right-hand side of the block. It may be beneficial, although not required, to arrange faster blocks on the left-hand side of the block. The split block may be configured as a second visual program block 100B having a double-width outer shape 104B. The split block may comprise a single input connection recess 108 (e.g., indicated by the "1" in the number of input connections column 212) and two output connection tabs 112 (e.g., indicated by the "2" in the number of output connections column 216). Because the split block is configured to route or detour data, the execution speed may be faster than some functions in a pipeline, but slower than other functions in the pipeline. The execution speed for the split block is defined as "Medium" in the function execution speed column 220 of the visual program block graphics table 200.

The splice block row 252 shows a graphical representation of a splice block in the block type image column 204. The splice block may be referred to herein as a flow control merge module. The function of the flow control merge module is to reunite, or combine, a previously split pipeline flow. Splitting may have occurred by setting multiple inputs or by inclusion of a conditional module in a preceding position in the pipeline. The splice block may be configured as a second visual program block 100B having a double-width outer shape 104B. The splice block may comprise two input connection recesses 108 (e.g., indicated by the "2" in the number of input connections column 212) and a single output connection tab 112 (e.g., indicated by the "1" in the number of output connections column 216). Because the splice block is configured to merge, or otherwise combine, data the execution speed may be faster than some functions in a pipeline, but slower than other functions in the pipeline. The execution speed for the splice block is defined as "Medium" in the function execution speed column 220 of the visual program block graphics table 200.

The output block row 256 shows a graphical representation of an output block in the block type image column 204. The function of the output block identified in the programming function column 208 is to provide an output comprising data processed by one or more intermediate blocks 170B in the pipeline. In some embodiments, an output block may close or end the complete program 160. There may only be one kind of output block that replies to error-correcting code. In some embodiments, there may be several instances of an output module within the same pipeline. The output block may not comprise an output connection tab 112 (e.g., indicated by the "0" in the number of output connections column 216) but may comprise a single input connection recess 108 (e.g., indicated by the "1" in the number of input connections column 212). As the output block either receives or produces an output, without additional processing, there may not be any execution speed associated with the output function and the output block. The execution speed in this instance may not be applicable as indicated by the not-applicable ("N/A") entry in the function execution speed column 220 of the visual program block graphics table 200.

Figure 3:
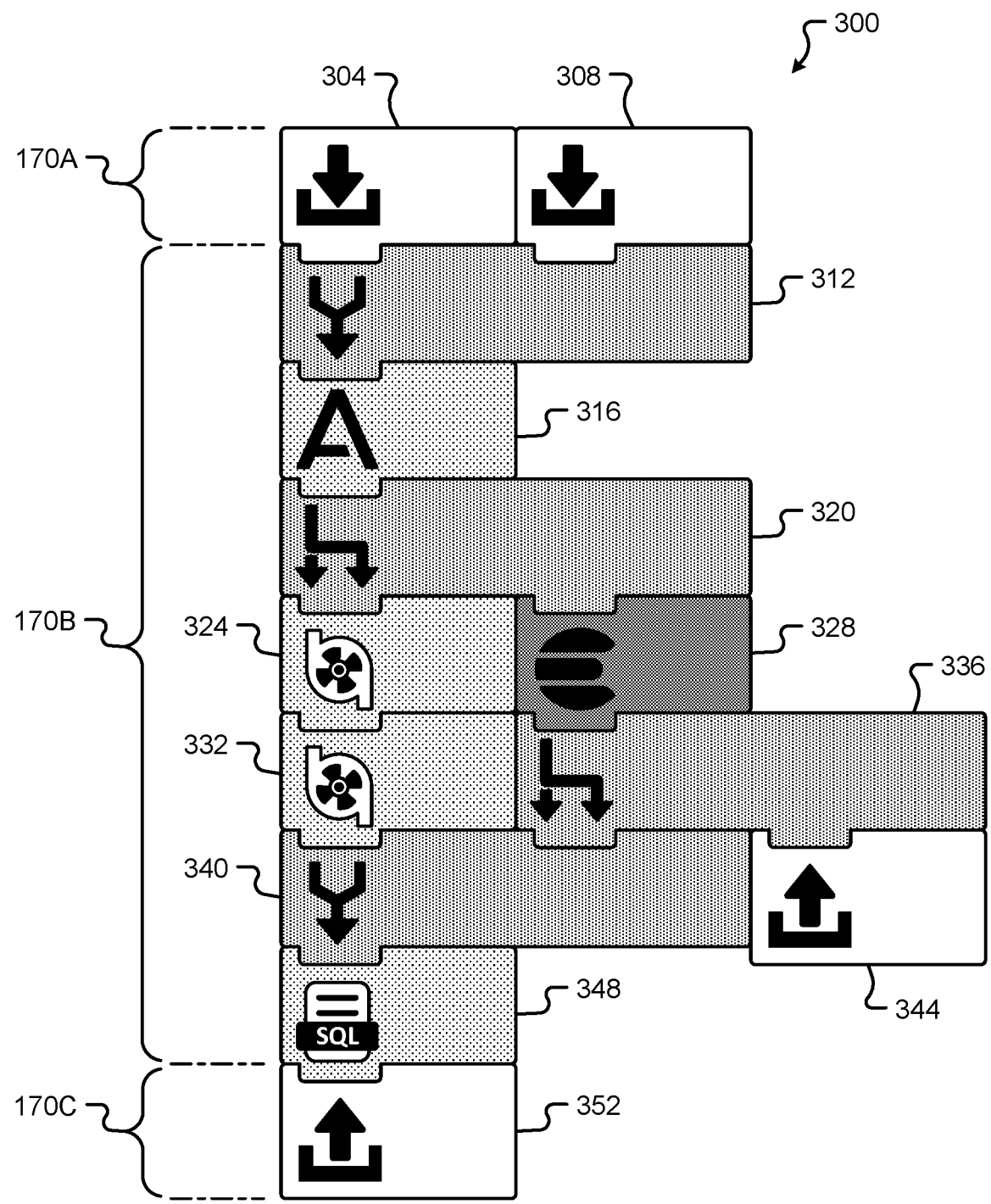
FIG. 3 is a graphical representation of a sample complete program using visual program blocks in accordance with embodiments of the present disclosure.

FIG. 3 shows a graphical representation of a sample complete program 300 using a plurality of visual program blocks 100A-100B configured as specific block types, for example, as described in conjunction with FIG. 2. The sample complete program 300 is structured as having at least one input block 170A, a plurality of intermediate blocks 170B, and a closing output block 170C. The arrangement of the visual program blocks 100A-100B in FIG. 3, may defined as a pipeline running from the input block 170A to the closing output block 170C. The pipeline defines a program, script, or function flow that begins at a first position, or level, and then sequentially runs through each immediately adjacent lower (e.g., subsequent) position, or level.

In the first (e.g., uppermost) level of the pipeline, the sample complete program 300 comprises a first input block 304 and a second input block 308 disposed laterally side-by-side to one another. The input from each of the first input block 304 and the second input block 308 is fed into the splice block 312 disposed in the second level of the pipeline. The splice block 312 represents the first intermediate block 170B of a plurality of intermediate blocks 170B. As illustrated in FIG. 3, the output connection tabs 112 of the first input block 304 and the second input block 308 interconnect with respective input connection recesses 108 of the splice block 312. The inputs from the first input block 304 and the second input block 308 may be merged in the splice block 312 and an output from the splice block 312 may be fed as in input to the custom code block 316. The custom code block 316 is shown in a third position of the pipeline.

In one embodiment, the custom code block 316 may query a decision table to obtain additional parameters for the flow in the pipeline. The decision table in custom code block 316 may be locally stored (e.g., internal to an enterprise, stored in a memory of a computer running the visual interlocking block based programming method, etc.). The pipeline may include intermediate blocks 320-344 to account for an output returned by the custom code block 316 (e.g., querying the decision table, etc.). For instance, the if all of the variables or parameters are present and non-empty, the flow may continue on the left-hand side of the split block 320, through the first pump block 324 and the second first pump block 324 to the second splice block 340. However, if all of the variables or parameters are not present, or some are empty, the flow may be detoured, or routed, to the right-hand side of the block split block 320. In this case, the flow may then be passed, from the custom code block 316 to the data lake code block 328 via the split block 320. The data lake code block 328 may run a script, function, or code that performs an Elasticsearch request of a data lake (e.g., to fill any empty variables or parameters not filled by the custom code block 316). A result of the data lake code block 328 may be passed to the second split block 336 interlocked with the output connection tab 112 of the data lake code block 328. If all of the variables or parameters are present and non-empty, the flow may continue on the left-hand side of the second split block 336 and then passed onto the second splice block 340. However, if all of the variables or parameters are not present and/or at least one variable and/or parameter is empty after the function of the data lake code block 328 is performed, the flow may be detoured, or routed, to the right-hand side of the second split block 336, for example, to an error output block 344. The error output block 344 may be configured to provide an error output stating that the functions failed to obtain the necessary variables or parameters (e.g., via the custom code block 316 and/or the data lake code block 328). This error output may be rendered to a display device, sent as a message to one or more communication devices (e.g., across a communication network, etc.), or otherwise forwarded to a user. At this point, the sample complete program 300 may end.

In the event, however, that either the custom code block 316 or the data lake code block 328 obtains of the necessary variables or parameters, the second splice block 340 may pass the appropriate data to the SQL code block 348 disposed in the eighth level of the pipeline. In some embodiments, the SQL code block 348 may perform an SQL query against tables contained in a local service data component (e.g., using the variables and/or parameters received from the second splice block 340, etc.) and pass a result on to the output block 352. The output provided by the output block 352 may be a URI or custom output. In some embodiments, the inputs and outputs in the pipeline may correspond to key-value pairs, etc. Other arrangements, configurations, and combinations of visual program blocks 100A-100B may be used to form a complete program 160.

Figure 4:
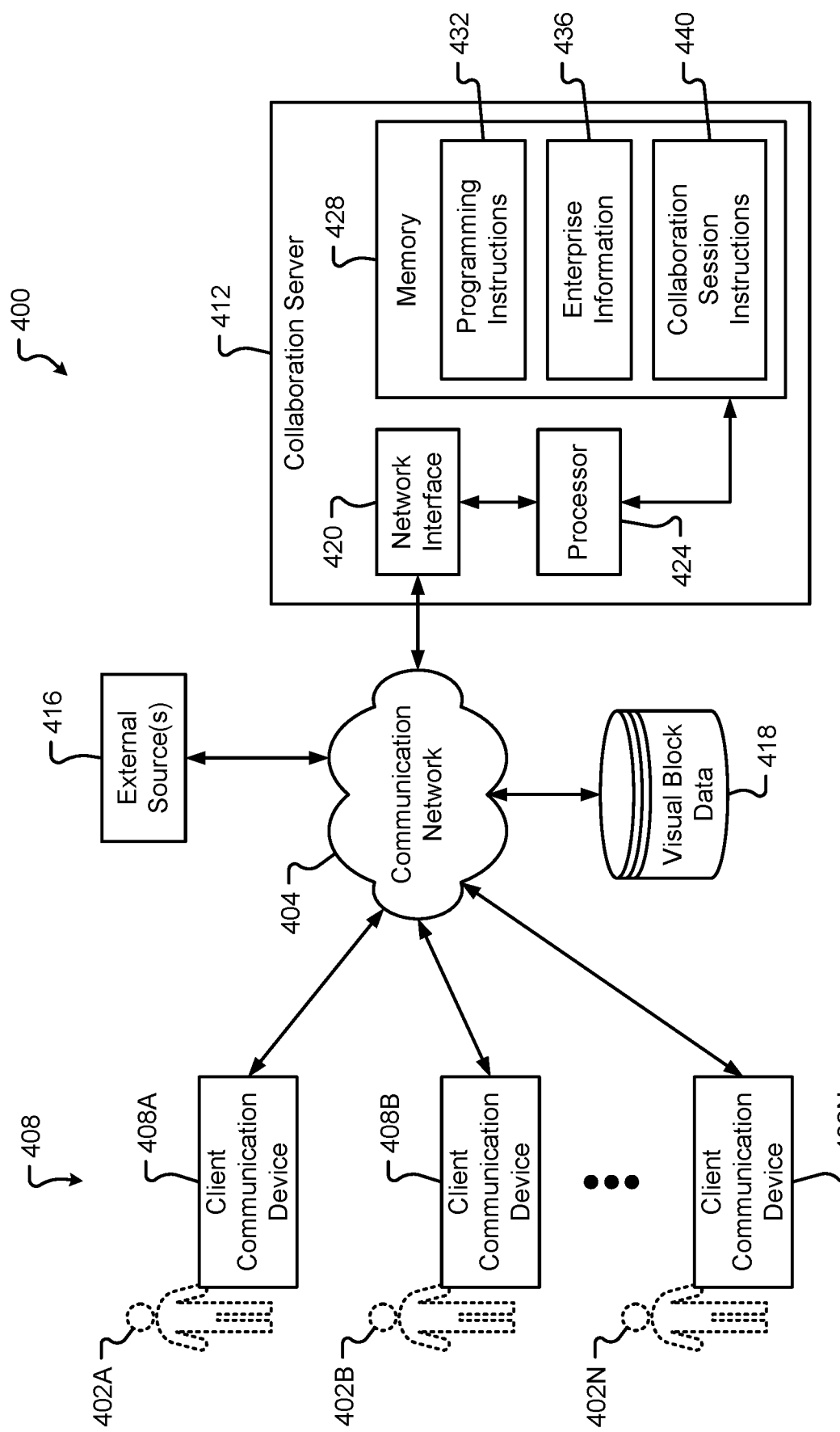
FIG. 4 depicts a block diagram of a collaborative communication system in accordance with at least some embodiments of the present disclosure.

FIG. 4 depicts a block diagram of a collaborative communication system 400 in accordance with at least some embodiments of the present disclosure. The collaborative communication system 400 of FIG. 4 may be a distributed system and, in some embodiments, comprises a communication network 404 connecting one or more communication devices 408 with a collaboration server 412. The collaborative communication system 400 may include, but is in no way limited to, one or more client communication devices 408A-408N, a collaboration server 412, one or more external source(s) 416, and visual block data storage memory 418. In some embodiments, the communication devices 408 may be communicatively connected to the collaboration server 412 over a communication channel (e.g., established across the communication network 404, etc.). The collaboration server 412 may provide collaborative communication sessions, conference meetings, multi-party calls, web-based conferencing, web-based seminars ("webinars"), joint programming interfaces, and/or other audio/video communication services. In any event, these collaborative communication sessions can include two, three, four, or more communication devices 408 that access the collaboration server 412 via the communication network 404.

One or more users 402A-402N may be associated with respective communication devices 408. For instance, a first user 402A is shown in FIG. 4 as being associated with a first client communication device 408A, the second user 402B is shown being associated with a second client communication device 408B, and other users 402N may be associated with other client communication devices 408N. As described herein, the client communication devices 408A-408N may comprise a browser application running thereon, through which, each user 402A-402N may access a functionality provided by the collaboration server 412.

In accordance with at least some embodiments of the present disclosure, the communication network 404 may comprise any type of known communication medium or collection of communication media and may use any type of protocols to transport messages between endpoints. The communication network 404 may include wired and/or wireless communication technologies. The Internet is an example of the communication network 404 that constitutes an Internet Protocol ("IP") network consisting of many computers, computing networks, and other communication devices located all over the world, which are connected through many telephone systems and other means. Other examples of the communication network 404 include, without limitation, a standard Plain Old Telephone System ("POTS"), an Integrated Services Digital Network ("ISDN"), the Public Switched Telephone Network ("PSTN"), a Local Area Network ("LAN"), a Wide Area Network ("WAN"), a Session Initiation Protocol ("SIP") network, a cellular network, and any other type of packet-switched or circuit-switched network known in the art. In addition, it can be appreciated that the communication network 404 need not be limited to any one network type, and instead may be comprised of a number of different networks and/or network types. The communication network 404 may comprise a number of different communication media such as coaxial cable, copper cable/wire, fiber-optic cable, antennas for transmitting/receiving wireless messages, and combinations thereof.

In some embodiments, at least one of the communication devices 408 may correspond to a computing device, a personal communication device, a portable communication device, a laptop, a smartphone, a tablet, a personal computer, and/or any other device capable of running an operating system ("OS"), at least one application, such as a web browser, and/or the like. The browser application may be configured to exchange communications between a respective communication device 408A-408N and the collaboration server 412. For instance, the communication devices 408, when configured as client communication devices (e.g., the client communication devices 408A-408N), may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These client communication devices 408A-408N, may also have any of a variety of applications, including for example, client applications, web browser applications, chat applications, video applications, social media applications, calling applications, email applications, calendar applications, etc., and/or combinations thereof.

Additionally or alternatively, communications may be sent and/or received via a respective communication device 408 as a telephone call, a packet or collection of packets (e.g., IP packets transmitted over an IP network), an email message, an IM, a short message service ("SMS") message, a multimedia messaging service ("MMS") message, a chat, and/or combinations thereof. As shown in FIG. 4, the communication devices 408 may communicate (e.g., via an audio and/or a video channel, etc.) over the communication network 404.

The collaboration server 412 may include hardware and/or software resources that, among other things, provide the ability to hold multi-party calls, conference calls, and/or other collaborative communications. The collaboration server 412 may include a network interface 420, a processor 424, and a memory 428. The collaboration server 412 may comprise programming instructions 432, enterprise information 436, collaboration session instructions 440, audio/video bridge instructions, conferencing information, and/or the like.

The network interface 420 provides the collaboration server 412 with the ability to send and receive communication packets or the like over the communication network 404. The network interface 420 may be provided as a network interface card ("NIC"), a network port, a modem, drivers for the same, and the like. Communications between the components of the collaboration server 412 and other devices connected to the communication network 404 for a collaborative communication session may flow through the network interface 420 of the collaboration server 412. In some embodiments, examples of a suitable network interface 420 include, without limitation, an antenna, a driver circuit, an Ethernet port, a modulator/demodulator, an NIC, an RJ-11 port, an RJ-45 port, an RS-232 port, a USB port, etc. The network interface 420 may include one or multiple different network interfaces depending upon whether the collaboration server 412 is connecting to a single communication network or multiple different types of communication networks. For instance, the collaboration server 412 may be provided with both a wired network interface and a wireless network interface without departing from the scope of the present disclosure. In some embodiments, the network interface 420 may include different communications ports that interconnect with various input/output lines.

In some embodiments, the processor 424 may correspond to one or more computer processing devices. For example, the processor 424 may be provided as silicon, an Application-Specific Integrated Circuit ("ASIC"), as a Field Programmable Gate Array ("FPGA"), any other type of Integrated Circuit ("IC") chip, a collection of IC chips, and/or the like. In some embodiments, the processor 424 may be provided as a Central Processing Unit ("CPU"), a microprocessor, or a plurality of microprocessors that are configured to execute the instructions sets stored in memory 428. Upon executing the instruction sets stored in memory 428, the processor 424 enables various collaborative communication, conferencing, and/or programming functions of the collaboration server 412, and may provide conferencing between one or more communication device (e.g., communication devices 408, etc.) over the communication network 404.

The memory 428, or storage memory, may correspond to any type of non-transitory computer-readable medium. In some embodiments, the memory 428 may comprise volatile or non-volatile memory and a controller for the same. Non-limiting examples of the storage memory 428 that may be utilized in the collaboration server 412 may include Random Access Memory ("RAM"), Read Only Memory ("ROM"), buffer memory, flash memory, solid-state memory, or variants thereof. Any of these memory types may be considered non-transitory computer memory devices even though the data stored thereby can be changed one or more times. The memory 428 may be used to store information about visual programs, past visual programs created, types of visual program blocks 100A-100B used in the visual programs, and/or the like. In some embodiments, the memory 428 may be configured to store rules and/or the instruction sets depicted in addition to temporarily storing data for the processor 424 to execute various types of routines or functions. Although not depicted, the memory 428 may include instructions that enable the processor 424 to store data into a visual block data storage memory 418 and retrieve information from the visual block data storage memory 418. In some embodiments, the visual block data storage memory 418 or data stored therein may be stored internal to the collaboration server 412 (e.g., within the enterprise information 436 of the memory 428 of the collaboration server 412 rather than in a separate database) or in a separate server.

In some embodiments, the collaboration server 412 may query and/or receive information, or data, from one or more external source(s) 416. One example of an external source 416 may be a data lake, or centralized repository, that stores structured and/or unstructured data. This data may be stored remotely (e.g., across the communication network 404) and apart from the collaboration server 412 in one or more servers and associated memory devices.

The collaboration server 412 may comprise programming instructions 432 that perform one or more of the visual interlocking block based programming methods described herein. The programming instructions 432 may provide a collaborative interface to be rendered by a display device (e.g., of the communication devices 408). The collaborative interface may be configured as a program edit window accessible by a communication device 408 (e.g., via a browser application running thereon, etc.). The program edit window may provide a plurality of visual program blocks 100A-100B, of various types, in an available segments region of the program edit window and a workspace region of the program edit window. The programming instructions 432 may include instructions that allow one or more users to move blocks from the available segments region into the workspace region to develop a pipeline and visual program. In some embodiments, the programming instructions 432 may retrieve business rules, visual block data, and/or previously made programs, etc., from at least one of the enterprise information 436 and/or the visual block data storage memory 418. When a visual program is created in the workspace region, based on an ordered sequence of visual program blocks 100A-100B, the complete program 160 can be saved in the memory 428 (e.g., in the enterprise information 436, etc.), in the visual block data storage memory 418, and/or some other memory (e.g., associated with a particular communication device 408, etc.).

The collaboration session instructions 440 may work in conjunction with the programming instructions 432 to provide a collaborative workspace for one or more connected client communication devices 408A-408N. For instance, users 408A-408N in a collaborative communication session may provide input via a respective communication device 408, and create, edit, save, or otherwise manipulate the visual program blocks 100A-100B in a program edit window and/or pipeline. The program edit window may correspond to a shared workspace that is capable of receiving program creation and/or edit input from any of the client communication devices 408A-408N connected to the collaboration server 412 via the communication network 404.

In some embodiments, the collaboration server 412 can include one or more resources such as conference mixers and other conferencing infrastructure. As can be appreciated, the resources of the collaboration server 412 may depend on the type of collaborative communication sessions, or services, provided by the collaboration server 412. Among other things, the collaboration server 412 may be configured to provide conferencing of at least one media type between any number of users 402A-402N. The conference mixer of the collaboration server 412 may be assigned to a particular communication session for a predetermined amount of time. In one embodiment, the conference mixer may be configured to negotiate codecs with one or more of the communication devices 408 participating in the collaborative communication session. Additionally or alternatively, the conference mixer may be configured to receive inputs (at least including audio inputs) from the communication devices 408 and mix the received inputs into a combined signal which can be monitored and/or analyzed by the collaboration server 412.

Figure 5:
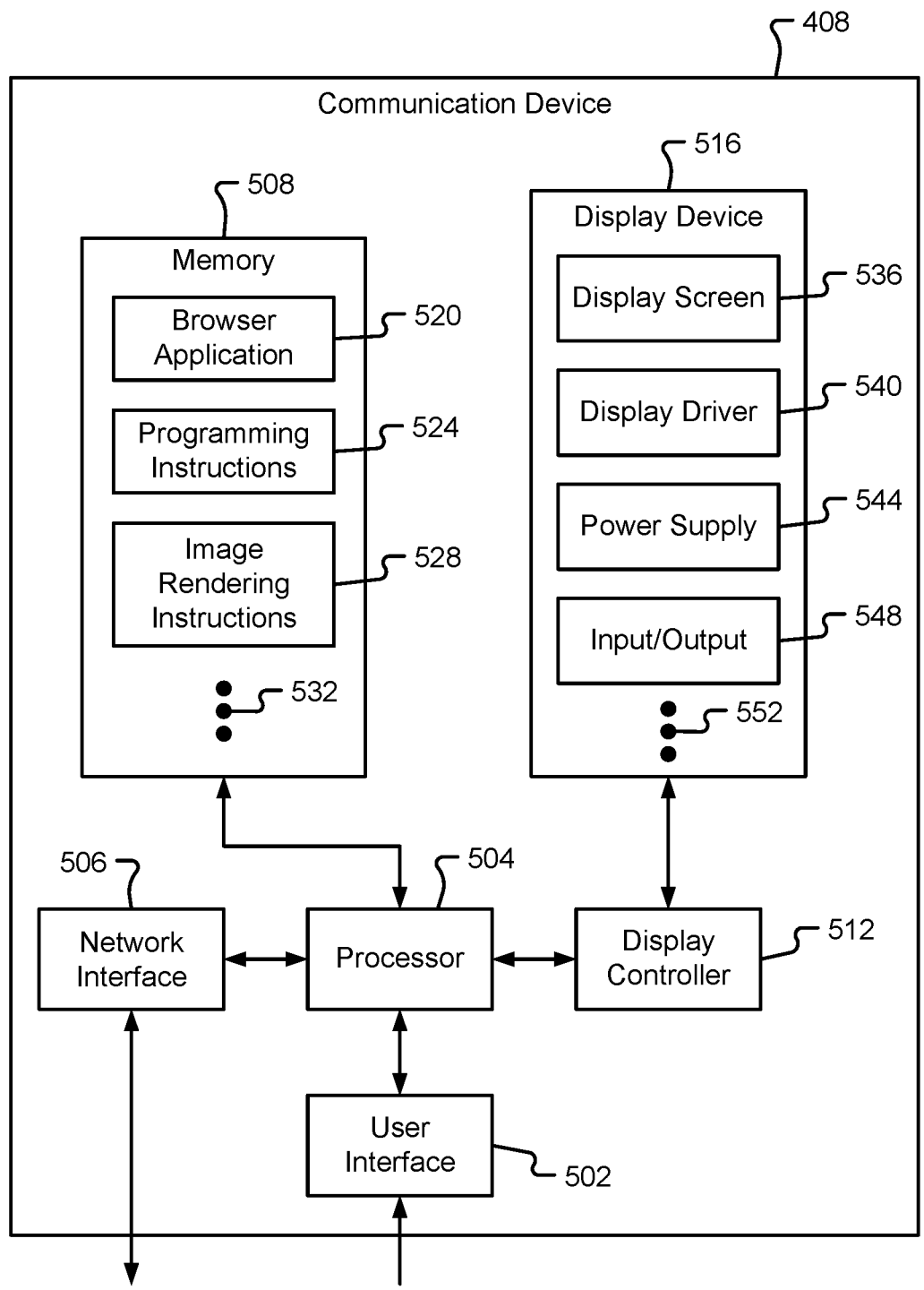
FIG. 5 is a block diagram depicting components of a communication device used in the communication system of FIG. 4 in accordance with at least some embodiments of the present disclosure.

FIG. 5 is a block diagram depicting components of a communication device 408 used in the communication system 400 of FIG. 4 in accordance with at least some embodiments of the present disclosure. The communication device 408 may correspond to one or more of the client communication devices 408A-408N. In any event, the communication device 408 is shown to include a computer memory 508 that stores one or more instruction sets, applications, or modules. The communication device 408 may be configured as a desktop computer, smartphone, and/or the like. The communication device 408 is also shown to include a user interface 502, one or more processors 504, a network interface 506 (e.g., a network communications interface, etc.), a display controller 512, and a display device 516 that may all be connected to one another via a power and/or a communications bus.

The user interface 502 may correspond to any type of input and/or output device, or combination thereof, that enables a user 402A-402N to interact with the communication device 408. As can be appreciated, the nature of the user interface 502 may depend upon the nature of the communication device 408. Examples of the user interface 502 may include, but are in no way limited to, user interface hardware and devices such as at least one touch-sensitive display elements, buttons, switches, keyboards, peripheral interface devices (e.g., mice, controllers, joysticks, etc.) and/or the like. It is an aspect of the present disclosure that one or more devices in the user interface 502 may provide an input that is interpreted by the processor 504 in controlling one or more components of the communication device 408. In one embodiment, input provided via the user interface 502 may serve as an input that manipulates one or more elements rendered as part of the program edit window. For instance, an input from a user 402A-402N (e.g., via the user interface 502 of a respective client communication device 408A-408N) may move one or more visual program blocks 100A-100B from the available segments portion of the program edit window into a workspace portion of the program edit window in creating or editing a visual program. Additionally or alternatively, the input from a user 402A-402N (e.g., via the user interface 502 of a respective client communication device 408A-408N) may move one or more visual program blocks 100A-100B in the workspace portion of the program edit window.

The processor 504 may correspond to one or many computer processing devices. Non-limiting examples of a processor include a microprocessor, an IC chip, a General Processing Unit ("GPU"), a CPU, or the like. Examples of the processor 504 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™ processors, ARM® Cortex-A and ARM926EJS™ processors, other industry-equivalent processors, and may perform computational functions using any known or future-developed standard, instruction set, libraries, and/or architecture. The processor 504 may be a multipurpose, programmable device that accept digital data as input, processes the digital data according to instructions stored in its internal memory, and provides results as output. The processor 504 may implement sequential digital logic as it has internal memory. As with most microprocessors, the processor 504 may operate on numbers and symbols represented in the binary numeral system.

The network interface 506 may comprise hardware that facilitates communications with other communication devices (e.g., the collaboration server 412, the external source(s) 416, the visual block data storage memory 418, etc.) over the communication network 404. In some embodiments, the network interface 506 may include an Ethernet port, a Wi-Fi card, an NIC, a cellular interface (e.g., antenna, filters, and associated circuitry), or the like. The network interface 506 may be configured to facilitate a connection between the collaboration server 412 and the communication network 404 and may further be configured to encode and decode communications (e.g., packets, etc.) according to a protocol utilized by the communication network 404.

The memory 508 may correspond to any type of non-transitory computer-readable medium. In some embodiments, the memory 508 may comprise volatile or non-volatile memory and a controller for the same. Non-limiting examples of memory 508 that may be utilized in the communication device 408 may include RAM, ROM, buffer memory, flash memory, solid-state memory, and/or variants thereof. Any of these memory types may be considered non-transitory computer memory devices even though the data stored thereby can be changed one or more times. In some embodiments, the memory 508 may be configured to store rules and/or the instruction sets depicted in addition to temporarily storing data for the processor 504 to execute various types of routines or functions. The computer memory 508 may store the browser application 520, programming instructions 524, image rendering instructions 528, and/or more 532.

The browser application 520 stored in the computer memory 508 of the communication device 408 may correspond to any application program that provides access to network (e.g., LAN, Internet, World Wide Web, etc.) content. Examples of the browser application 520 may include, but are in no way limited to, Microsoft® Internet Explorer, Microsoft® Edge, Google® Chrome, Mozilla Firefox®, Apple® Safari, and/or the like. In some embodiments, the browser application 520 may run a browser-based application. The browser-based application may run via the collaboration server 412 and the communication device 408 connected to the collaboration server 412 may correspond to a client device.

The programming instructions 524, when executed by the processor 504, may perform one or more of the visual interlocking block based programming methods described herein. In some embodiments, the programming instructions 524 may correspond to the may programming instructions 432 stored in the memory 428 of the collaboration server 412, allowing a communication device 408 to create, edit, or otherwise manipulate visual programs alone, or in conjunction with the collaboration server 412. The programming instructions 524 may provide an interface to be rendered by the display device 516. The interface may be provided via the browser application 520 in the form of a program edit window. The program edit window may provide a plurality of visual program blocks 100A-100B, of various types, in an available segments region of the program edit window and a workspace region of the program edit window. The programming instructions 524 may include instructions that allow a user 402A-402N of the communication device 408 to move blocks from the available segments region into the workspace region to develop a pipeline and visual program. In some embodiments, the programming instructions 524 may retrieve business rules, visual block data, and/or previously made programs, etc., as described above. When a visual program is created in the workspace region, based on an ordered sequence of visual program blocks 100A-100B, the complete program 160 can be saved in the memory 508 or in some other memory (e.g., the memory 428 of the collaboration server 412, the visual block data storage memory 418, etc.).

The image rendering instructions 528, when executed by the processor 504, may enable the communication device 408 to display, or otherwise render, the program edit window to the display device 516. In some embodiments, the image rendering instructions 528 may receive information from the collaboration server 412 in determining a presentation of the program edit window to render to the display device 516. The program edit window, when configured as a web-based application (e.g., hosted by the collaboration server 412, etc.) may render movements made by the user 402A-402N (e.g., interacting with the user interface 502, etc.) of a communication device 408 and/or movements made by any other user 402A-402N associated with a different communication device 408A-408N where the elements of the program edit window are being manipulated in a shared, collaborative communication session.

In some embodiments, the communication device 408 may comprise at least one display device 516 that renders information, applications, windows, interactive elements, and/or other visual output to at least one display screen 536. The communication device 408 may include at least one display controller 512 that controls an operation of the display device 516. This operation may include the control of input (e.g., input provided by the user 402A-402N via the user interface 502, command input via the instruction sets in memory 508, and/or combinations thereof, etc.), output (e.g., display, rendered images, window behavior, etc.) and/or other functions of the display device 516 and a display controller 512.

As described above, the display device 516 may comprise at least one display screen 536 that selectively activates pixels and/or display elements to render one or more applications, windows, controls, interactive elements, icons, characters, images, etc. Examples of the display screen 536 may include, but are in no way limited to, a Liquid Crystal Display ("LCD"), a Light Emitting Diode ("LED") display, an Electroluminescent Display ("ELD"), an Organic LED ("OLED") display, and/or some other type of display. In some embodiments, the display device 516 may be configured to render information in one or more discrete areas (e.g., areas, backgrounds, portions, regions, windows, zones, etc.) of the display screen 536 or superimposed in an area of the display screen 536.

The display device 516 may include a display driver 540, a power supply 544, an input/output 548, and/or other components 552 that enable operation of the display device 516. The display driver 540 may receive commands and/or other data provided by the processor 504 and one or more of the instruction sets in memory 508. In response to receiving the commands, the display driver 540 may generate the driving signals necessary to render the appropriate images to the display screen 536.

The power supply 544 may provide electric power to one or more components of the display device 516. In one embodiment, the power supply 544 may include a transformer and/or other electronics that prevent overloading, condition power signals, and/or provide backup power to the display device 516. The input/output 548 may correspond to one or more connections for receiving or exchanging information and/or video from components of the communication device 408 (e.g., the processor 504, etc.). The input/output 548 may comprise a high-definition multimedia interface ("HDMI") input, DisplayPort ("DP") input, Ethernet, composite video, component video, H.264, or some other video connection type.

FIGS. 6A-6G show block diagrams of various presentations 600A-600G of a program edit window 604 during the creation and/or manipulation of a visual program in accordance with embodiments of the present disclosure. The program edit window 604 may be rendered as part of a browser application to a display device 516 of a communication device 408. The browser application and/or the program edit window 604 may comprise window controls 602 that at least one of minimize, maximize, and close the browser application. Additionally or alternatively, the browser application and/or the program edit window 604 may comprise one or more navigation controls 608. The navigation controls 608 may allow a user to navigate to a previous page, navigate to a subsequent page, and/or reload the current page using a discrete icon and, in some cases, by providing a single click selection. The browser application and/or the program edit window 604 may comprise an address bar 612. The address bar 612 may receive an IP address, a website, a network address, and/or some other location on a network (e.g., communication network 404, etc.). In some embodiments, the address bar 612 may accept search terms, perform a search of various addresses, sites, and/or the like, and provide results of the search in the program edit window 604.

The program edit window 604 may comprise an area (e.g., disposed beneath the address bar 612, etc.) of the display in a divided single-page layout. The single-page layout may comprise a workspace region 616 and an available segments region 620. In some embodiments, the workspace region 616 and the available segments region 620 may be separated, or distinguished, from one another by a region divider 622. The region divider 622 may be configured as a vertical line or page divider. Although shown having two regions 616, 620, the program edit window 604 is rendered as a single-page and single-window. Stated another way, the program edit window 604 allows users 402A-402N to create, edit, and/or otherwise manipulate visual program blocks 100A-100B of a visual program using a single-page and/or a single-window.

The workspace region 616 may comprise a region of the program edit window 604 where one or more visual program blocks 100A-100B (e.g., from the available segments region 620) may be placed in forming a complete program 160 or pipeline. In some embodiments, the workspace region 616 may include a collaborative user bar 624 showing other one or more users 402A-402N when in a collaborative communication session. It is an aspect of the present disclosure that one or more of these users 402A-402N may be able to manipulate portions (e.g., visual program blocks 100A-100B, etc.) in the workspace region 616, the available segments region 620, and/or the like, when in a collaborative communication session. In some embodiments, the users 402A-402N may have shared access to all of the features of the program edit window 604. As shown in FIGS. 6A-6G, five users are illustrated in the collaborative user bar 624 and may be participating in the collaborative communication session (e.g., to develop a visual program, etc.). Each user shown in the collaborative user bar 624 may see the same presentation 600A-600G of the program edit window 604 over time via a display device 516 of a respective communication device 408.

The available segments region 620 may comprise a number of visual program blocks 100A-100B available for use in a visual program. In some embodiments, the available segments region 620 may include all of the visual program blocks 100A-100B available in creating the visual program (e.g., the complete program 160). In one embodiment, the visual program blocks 100A-100B shown in the available segments region 620 may change as blocks are added to the workspace region 616 and/or pipeline. While the available segments region 620 of the program edit window 604 show nine block types available to use in the pipeline, embodiments of the present disclosure are not so limited. The available segments region 620 may include, but are in no way limited to, an input block 628, a custom code block 636, a pump block 632, an SQL code block 640, a split block 648, a splice block 652, an API code block 654, a data lake code block 644, and an output block 656. These blocks 628-656 are shown in order, from top to bottom, in the presentations 600A-600G of FIGS. 6A-6G.

The input block 628 may correspond to the block type illustrated in the input block row 228 of the visual program block graphics table 200. The custom code block 636 may correspond to the block type illustrated in the custom code block row 236 of the visual program block graphics table 200. The pump block 632 may correspond to the block type illustrated in the pump block row 232 of the visual program block graphics table 200. The SQL code block 640 may correspond to the block type illustrated in the SQL block row 240 of the visual program block graphics table 200. The split block 648 may correspond to the block type illustrated in the split block row 248 of the visual program block graphics table 200. The splice block 652 may correspond to the block type illustrated in the splice block row 252 of the visual program block graphics table 200. The data lake code block 644 may correspond to the block type illustrated in the data lake block row 244 of the visual program block graphics table 200. The output block 656 may correspond to the block type illustrated in the output block 656 of the visual program block graphics table 200. The API code block 654 may correspond to a block type that performs a remote procedure call (RPC, REST, CRUD, etc.) request to an external system (e.g., external source(s) 416, etc.) in order to obtain parameters or variables that cannot be determined locally. The requests of the API code block 654 may be created on the spot and given a name to be reused later. Choosing a specific programming function type of the API code block 654 may be done through a dropdown menu within the defined area of the block (e.g., the dropdown icon in the specific programming function name 124, etc.). In some embodiments, the specific programming function of an API code block 654 may contain a version number. The particular version of the specific programming function of the API code block 654 may be selectable through the dropdown menu within the defined area of the block.

While accessing the program edit window 604, a user 402A-402N may move (e.g., via an input provided by their respective client communication device 408A-408N) at least one of the visual program blocks 100A-100B represented in the available segments region 620 into the workspace region 616. More specifically, a user 402A-402N may move a particular type 628-656 of each visual program block 100A-100B shown in the available segments region 620 from the left-hand side of the region divider 622 across the region divider 622 and into the workspace region 616, creating a pipeline. The movement input provided by a user 402A-402N may correspond to selection input in the available segments region 620 selecting a particular type of visual program blocks 100A-100B, followed by a drag input across the region divider 622, and then a drop input when the selected particular type of visual program block 100A-100B is in, or over, the workspace region 616. In some embodiments, this combination movement/input may be referred to as a drag-selection input, a drag-and-drop input, and/or the like.

Figure 6A:
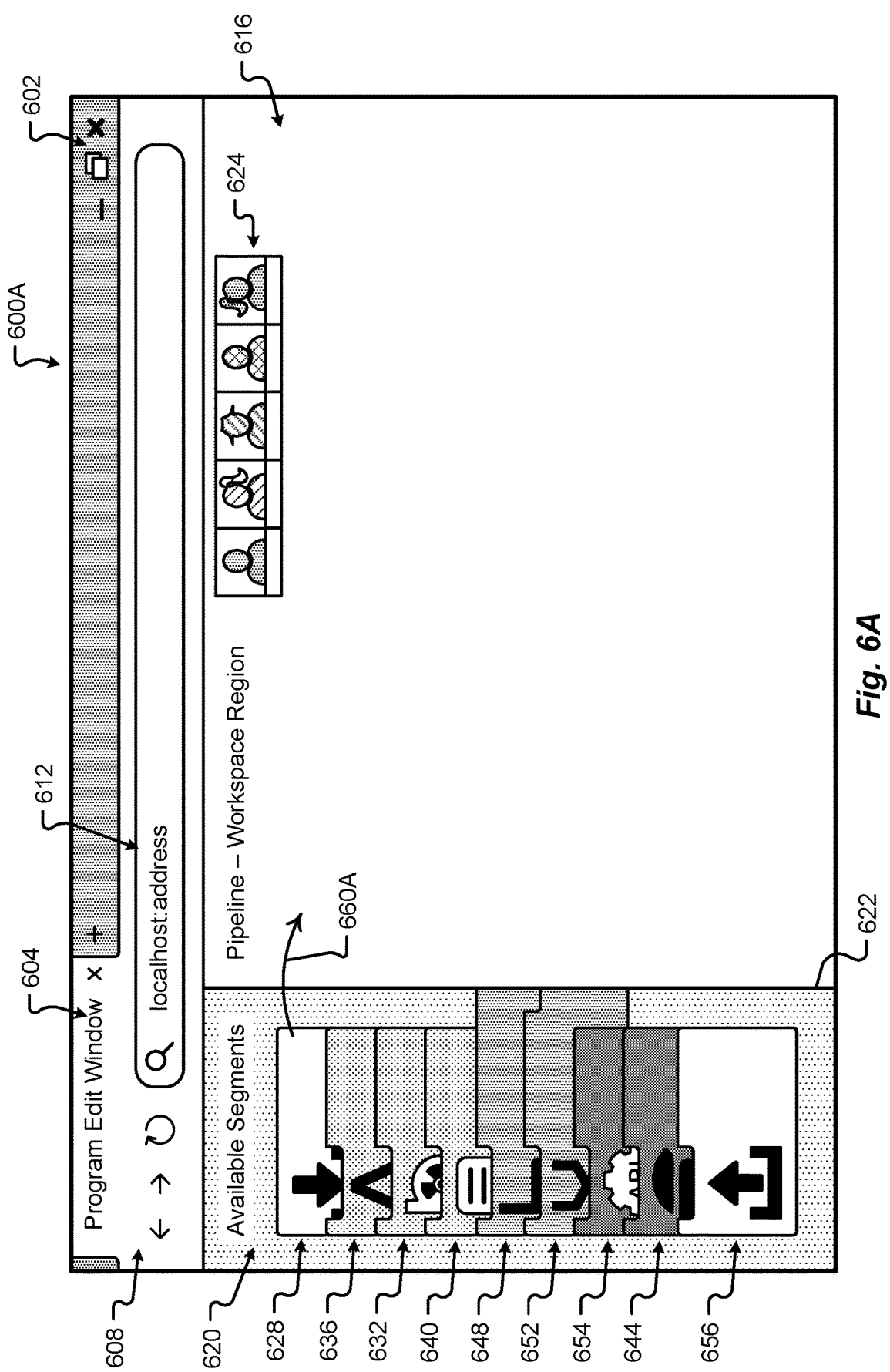
FIG. 6A is a block diagram depicting a first presentation of a visual interlocking block based program edit window in accordance with at least some embodiments of the present disclosure.

Referring to FIG. 6A a block diagram depicting a first presentation 600A of a visual interlocking block based program edit window 604 is shown in accordance with at least some embodiments of the present disclosure. In FIG. 6A, the workspace region 616 includes no visual program blocks 100A-100B in the pipeline. To begin creating the visual program, a user 402A-402N may provide a first drag selection input 660A of the input block 628, or rather the graphical representation of the input block 628, shown in the available segments region 620 across the region divider 622 and into the workspace region 616.

Figure 6B:
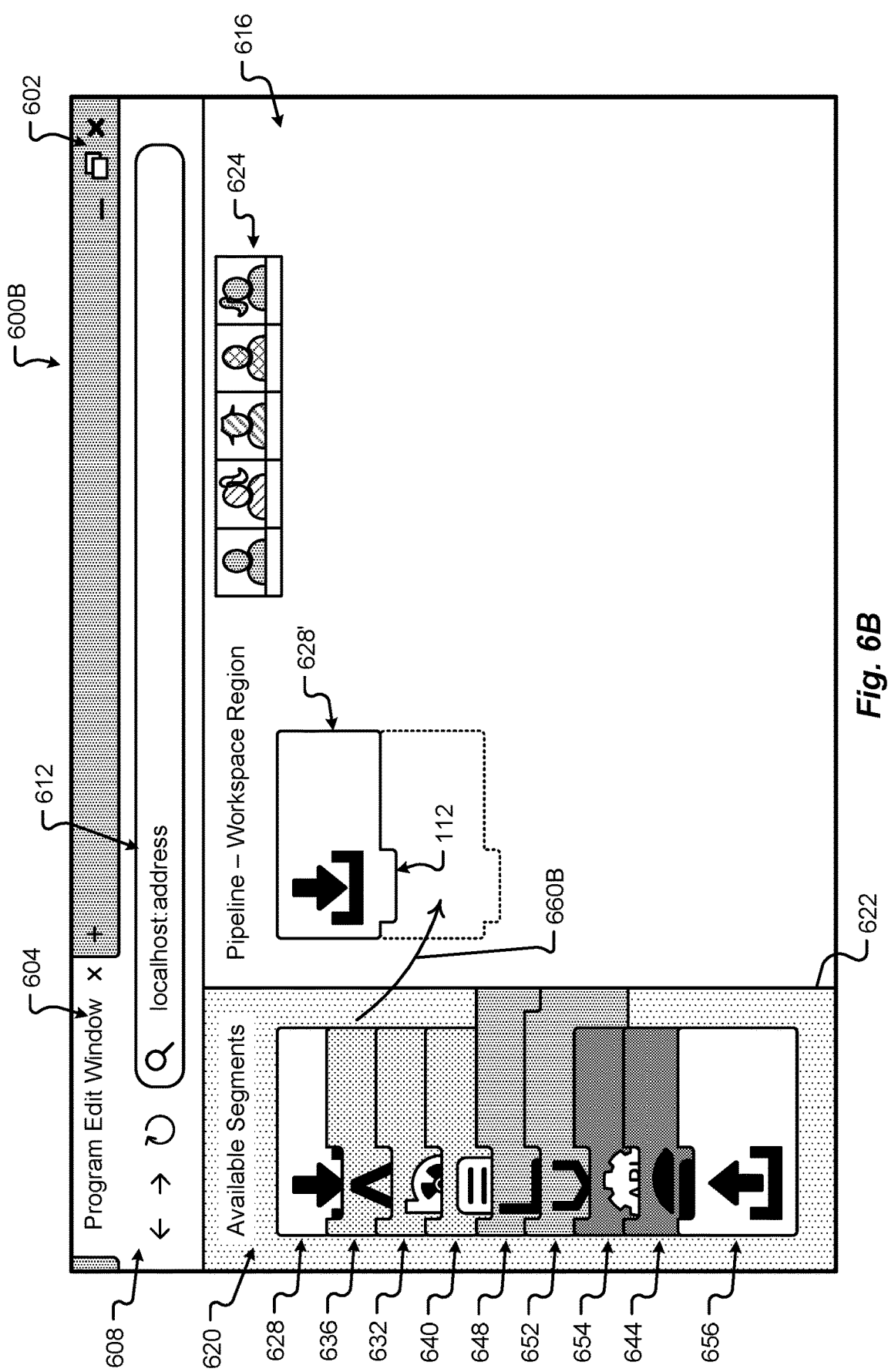
FIG. 6B is a block diagram depicting a second presentation of the visual interlocking block based program edit window in accordance with at least some embodiments of the present disclosure.

FIG. 6B shows a block diagram depicting a second presentation 600B of the visual interlocking block based program edit window 604 when the input block 628 is dropped into the workspace region 616. When dropped into the workspace region 616, the graphical representation of the input block 628 is shown as a placed input block 628' in a first (e.g., uppermost) position of the visual computer program pipeline. The placed input block 628' may serve as the start of the visual program (e.g., the input block 170A). The placed input block 628' may comprise an output connection tab 112 to which a first intermediate block 170B may be attached. In FIG. 6B, a user 402A-402N may provide a second drag selection input 660B moving the custom code block 636 from the available segments region 620 across the region divider 622 into the workspace region 616 of the program edit window 604. The position for the first intermediate block 170B is shown in dashed-lines in the second presentation 600B in a second position in the pipeline.

Figure 6C:
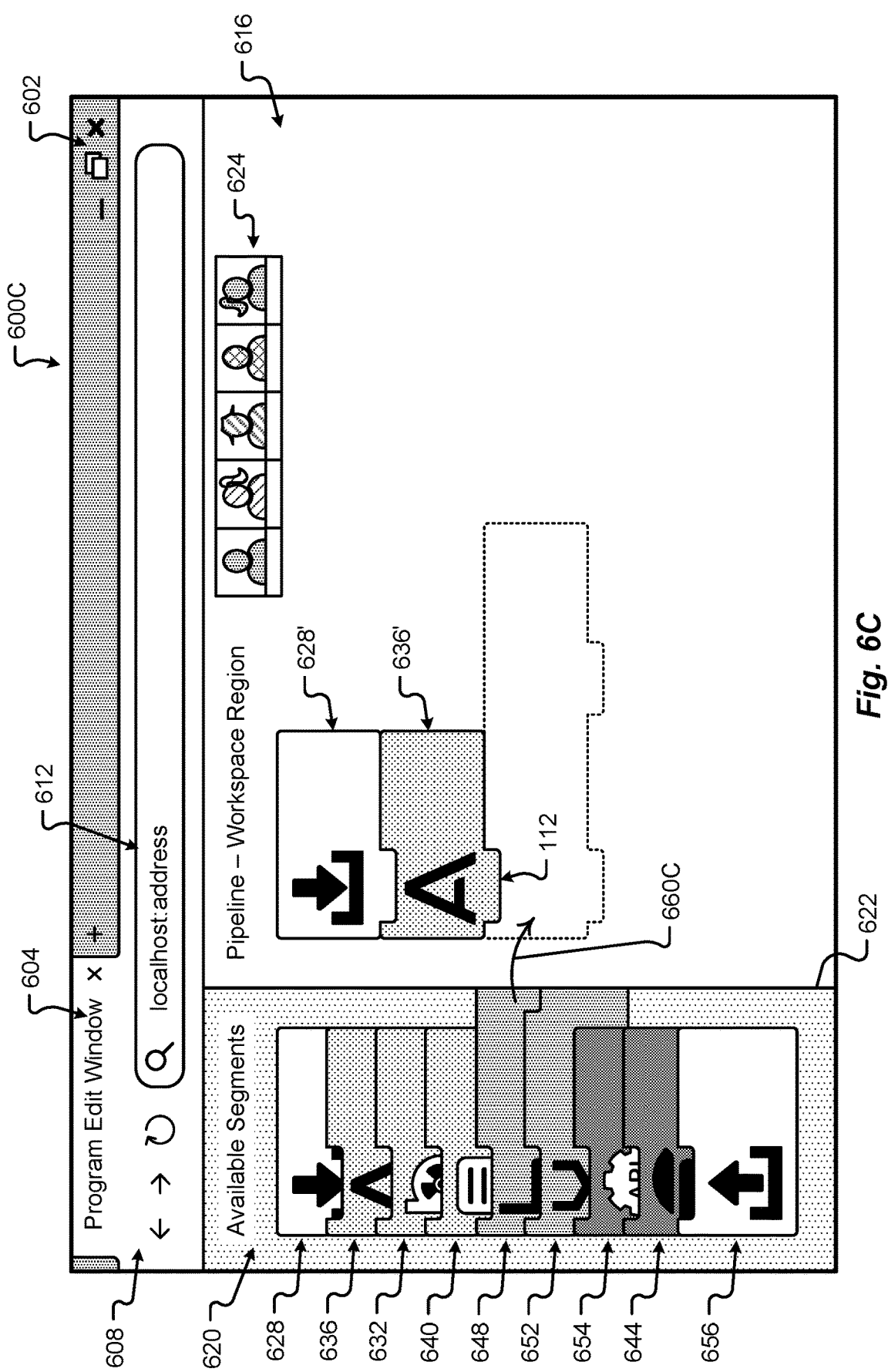
FIG. 6C is a block diagram depicting a third presentation of the visual interlocking block based program edit window in accordance with at least some embodiments of the present disclosure.

In FIG. 6C, the custom code block 636 is dropped into connection with the output connection tab 112 of the placed input block 628'. Once the custom code block 636 is interlocked with the placed input block 628', the connected custom code block 636' becomes the first intermediate block 170B in the pipeline. As shown in the third presentation 600C of FIG. 6C, the connected custom code block 636' is in the second position, or level, of the visual program pipeline. In FIG. 6C, a user 402A-402N may provide a third drag selection input 660C moving the split block 648 from the available segments region 620 across the region divider 622 into the workspace region 616 of the program edit window 604. The position for the second intermediate block 170B is shown in dashed-lines in the third presentation 600C in a third position in the pipeline.

Figure 6D:
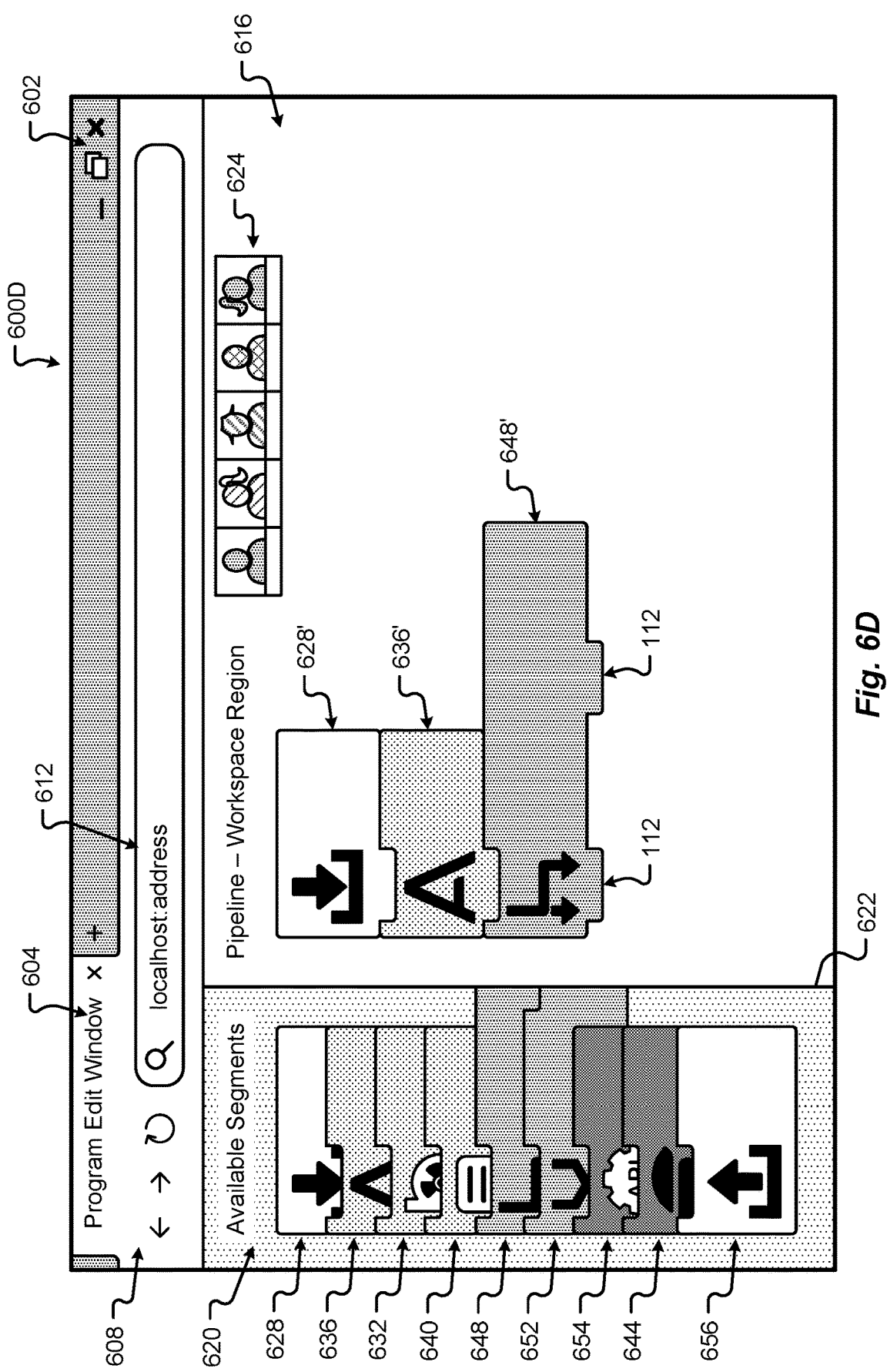
FIG. 6D is a block diagram depicting a fourth presentation of the visual interlocking block based program edit window in accordance with at least some embodiments of the present disclosure.

FIG. 6D is a block diagram depicting a fourth presentation 600D of the visual interlocking block based program edit window 604 in accordance with at least some embodiments of the present disclosure. In FIG. 6D, the visual program comprises the placed input block 628' in the first position, the connected custom code block 636' in the second position, and the connected split block 648' in the third position. The connected split block 648' comprises two output connection tabs 112 to which separate visual blocks may be respectively attached.

Figure 6E:
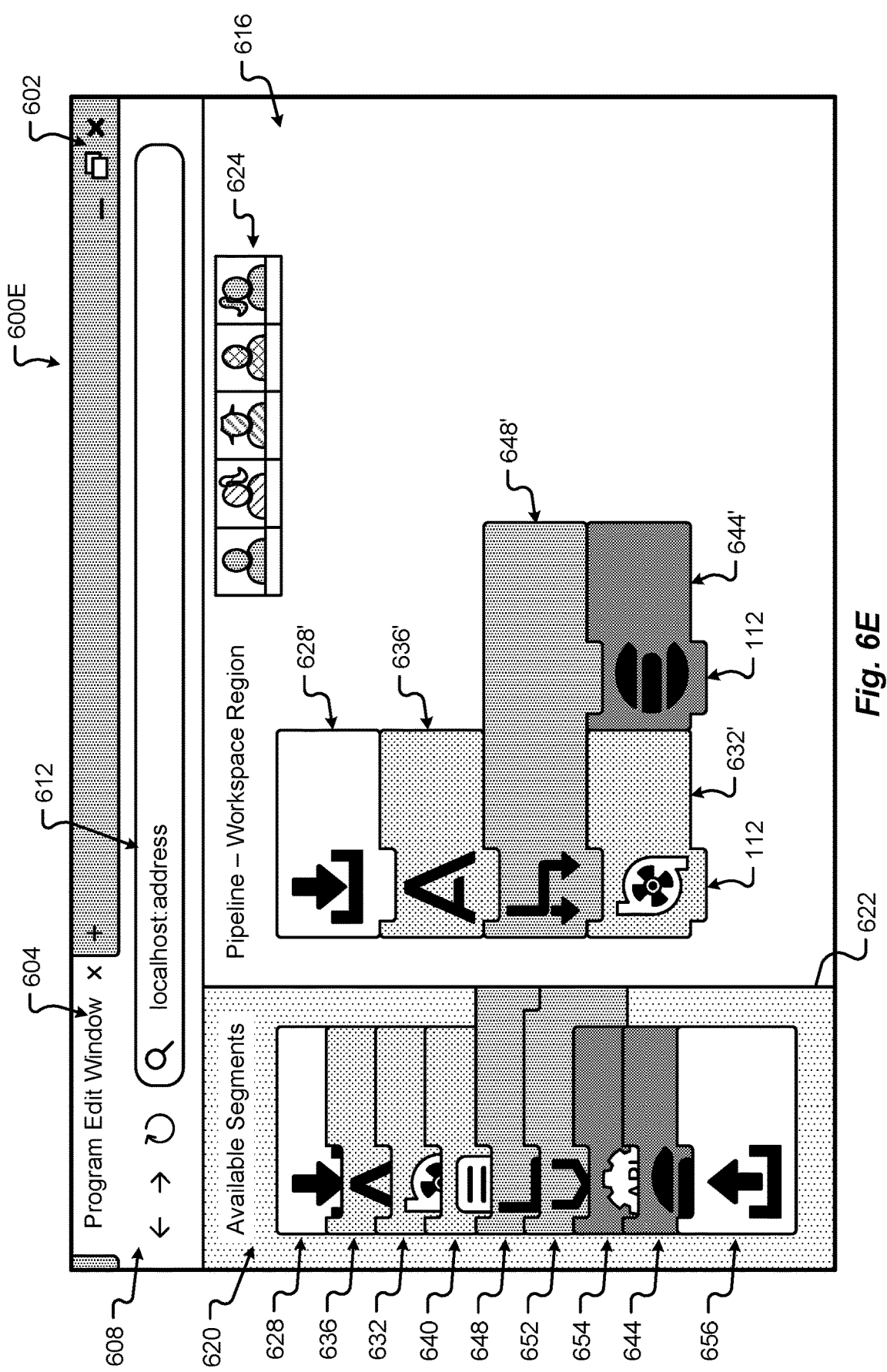
FIG. 6E is a block diagram depicting a fifth presentation of the visual interlocking block based program edit window in accordance with at least some embodiments of the present disclosure.
Figure 6F:
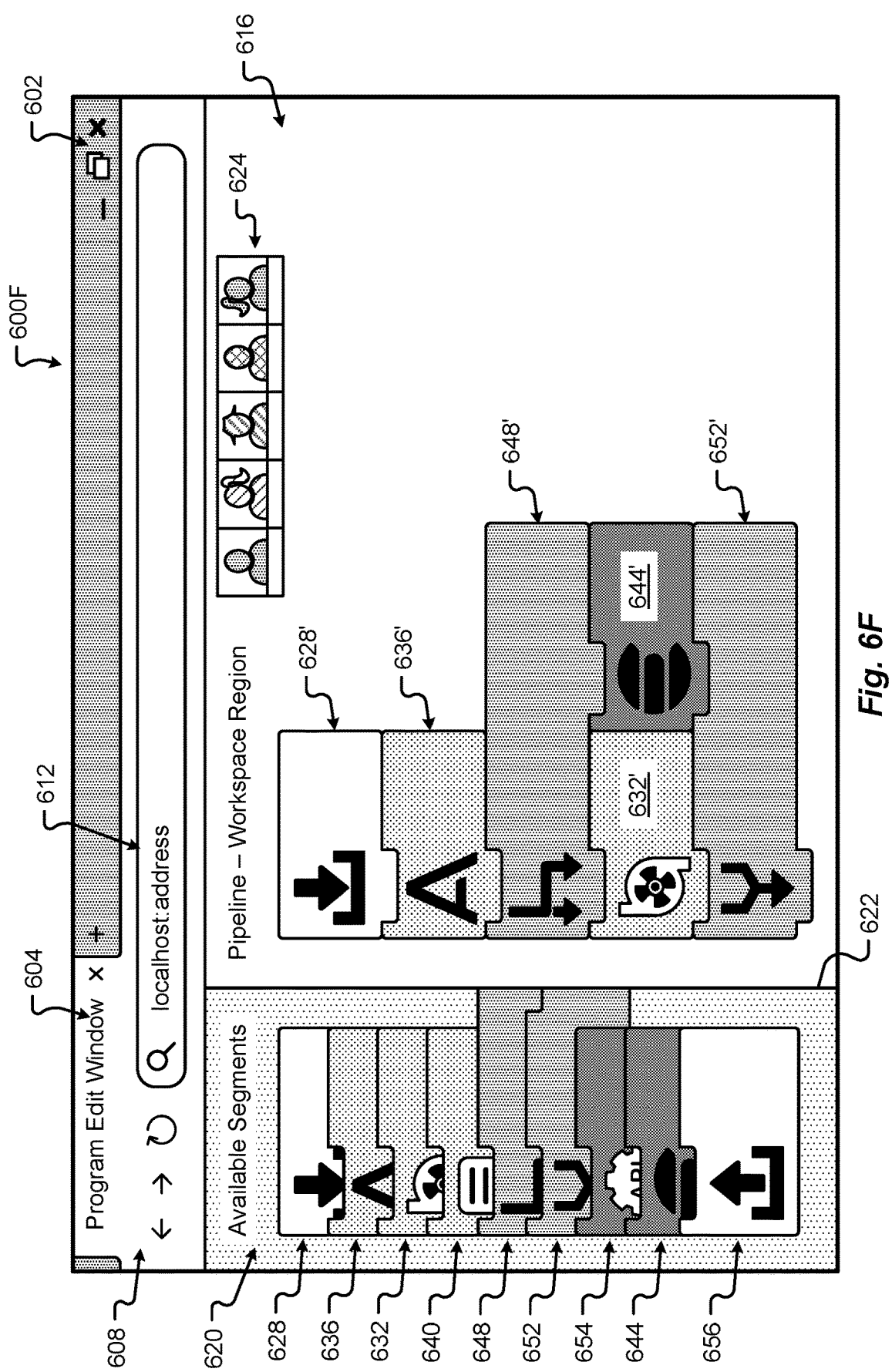
FIG. 6F is a block diagram depicting a sixth presentation of the visual interlocking block based program edit window in accordance with at least some embodiments of the present disclosure.

FIG. 6E shows a connected pump block 632' on the left-hand output connection tab 112 of the connected split block 648'. A connected data lake code block 644' is shown connected to the right-hand output connection tab 112 of the connected split block 648'. In the fifth presentation 600E of the visual interlocking block based program edit window 604 of FIG. 6E, the connected pump block 632' and the connected data lake code block 644' are each in the fourth position of the pipeline. In FIG. 6F, the connected splice block 652' is interconnected with the output connection tab 112 of the connected pump block 632' and the output connection tab 112 of the connected data lake code block 644'. The connected splice block 652' is shown in the fifth position of the pipeline in the sixth presentation 600F.

Figure 6G:
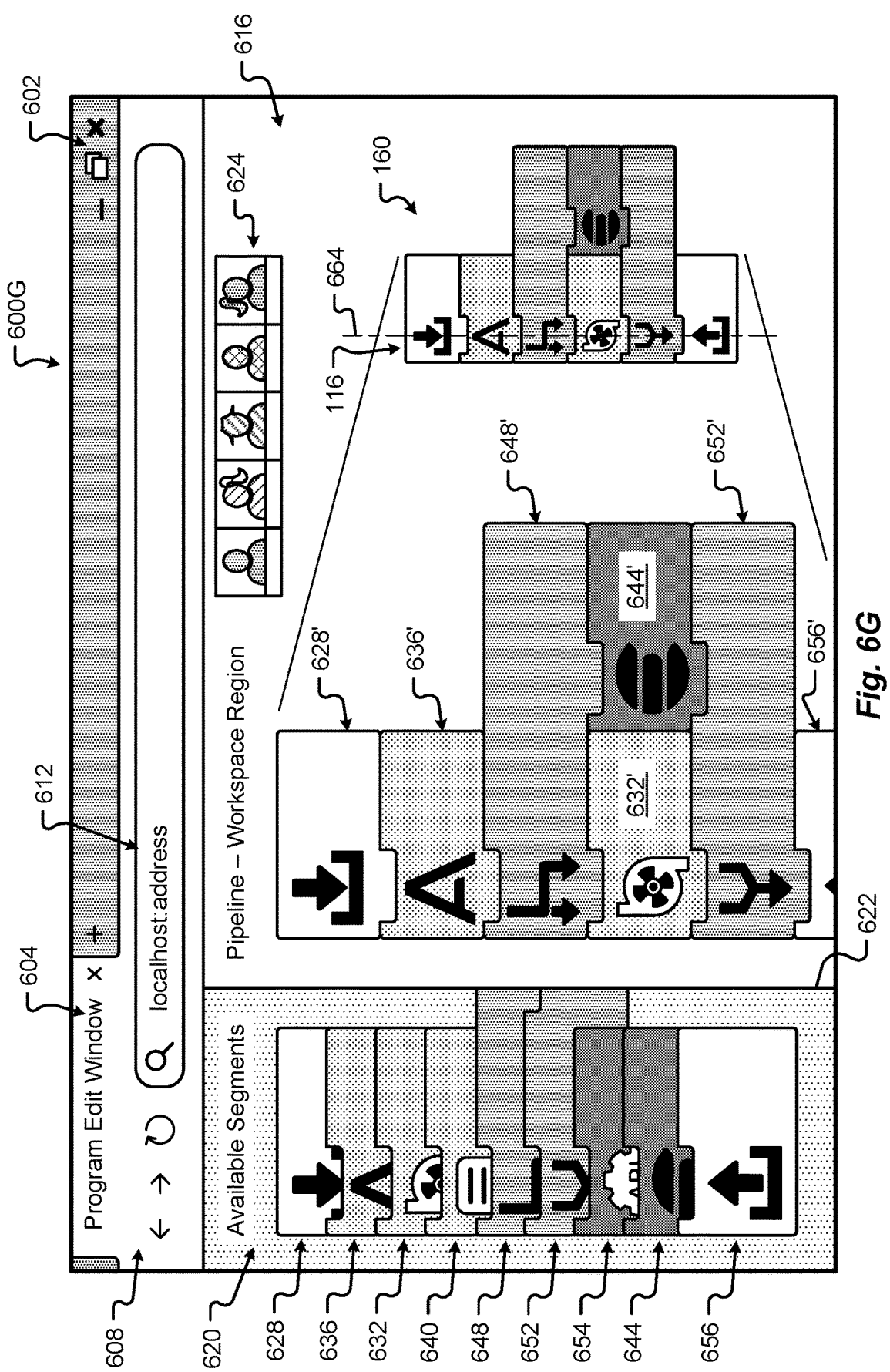
FIG. 6G is a block diagram depicting a seventh presentation of the visual interlocking block based program edit window in accordance with at least some embodiments of the present disclosure.

FIG. 6G shows a block diagram depicting a seventh presentation 600G of the visual interlocking block based program edit window 604, where the visual program formed by the placed and connected blocks 628'-656' is closed by the connected output block 656' in the final, or lowermost, position in the pipeline. When the visual program comprises an input block 170A, at least one intermediate block 170B, and an output block 170C, the complete program 160 is formed. As illustrated in FIG. 6G, a detail view of the complete program 160 is shown in the right-hand side of the workspace region 616 where each icon 116 of the blocks 100A-100B making up the complete program 160 is aligned along a centerline forming an aligned visual program hieroglyph 664. The aligned visual program hieroglyph 664 may visually, or graphically, describe a complete program 160, the functions associated with the complete program 160, and/or otherwise allow a user 402A-402N to differentiation one visual program from another. Once completed, the complete program 160 may be stored in one or more memory storage locations of the collaborative communication system 400.

FIGS. 7A-7D show various block diagrams of decision tables 700A-700D in accordance with embodiments of the present disclosure. Each decision table 700A-700D may comprise one or more conditions 704 and output 708. The conditions 704 may include labels and a set of enumerated conditions for each label (e.g., C1-CN, etc.). The output 708 may comprise key-value pairs 716.

As described herein, the decision tables 700A-700D may be two-dimensional tables consisting in a set of inputs, known as conditions 704, represented as columns and a set of outputs represented as rows. Conditions 704 may comprise matching strings, numbers, times and dates or intervals of numbers, times and dates, and/or the like. Intervals of strings in alphabetical order may not be considered but partial strings with wildcards may. Outputs comprise key pairs, for example, having a name and a value. FIG. 7A shows a first decision table 700A comprising a set of immutable values (e.g., the conditions header cell, label cell, output cell, key cell, and value cell) that may be common to every decision table 700A-700D. In some embodiments, these cells may not be changeable by a user 402A-402N. The cells identified as C1-CN, may represent the name of the conditions 704 for which a user 402A-402N may select the desired output 708. These cells may be modifiable by the user 402A-402N and may be entered before any desirable output. The key-value cells under the "Key" and "Value" header cells may represent key-value pairs to be returned when the conditions 704 represented in cells C1-CN in the same row are matched. Both of these types may be modifiable by the user 402A-402N at any time. A particular set of conditions (e.g., criteria) may have a unique label attached to it. There may be multiple rows with the same criteria and, in such cases, the rows must have the same label. There may also be a uniqueness condition for every row comprising a combination of the key and the whole set of conditions 704.

Stated another way, each particular criteria may only have assigned one instance of a particular key. The value may be an independent variable at all times. In some embodiments, two different sets of conditions may return the same key-value pair of outputs. Table creation may occur in two stages. In a first stage the user 402A-402N may determine the number of conditions in the table, names, and types. Types may be text, numeric, date/time, or Boolean. In the second stage the user 402A-402N may determine the key-value pairs 716 and the matching conditions for their values. In the case of numbers and date/times values may be single or comprise an interval. Intervals may be bounded or unbounded, open or closed, or any combination thereof. In one embodiment, text types may have a similar, if not identical, treatment. In some embodiments, wildcard values may also be permitted.

FIG. 7B is a block diagram of a second decision table 700B in accordance with at least some embodiments of the present disclosure. In some embodiments, the pipeline may return one single action to an output block (e.g., the output block shown and described in conjunction with the output block row 256 of the visual program block graphics table 200). At least one table in a pipeline may have key cells labeled as "Action." For instance, the table 700B illustrated in FIG. 7B can return one of two types of "Action," namely "WaitTreatment" or "Bridge" depending on the two given conditions 704 (e.g., "AvailableAgents" and "CustomerImportance").

FIG. 7C is a block diagram of a third decision table 700C in accordance with at least some embodiments of the present disclosure. In some embodiments, action behavior may be modifiable through parameters. These parameters may be obtained in a similar, if not identical, manner as the Action. In some embodiments, the only difference may be that multiple parameters may be obtained from a single table as shown in FIG. 7C. These tables 700C may be ordered, or arranged, by label and/or by key. As shown in FIG. 7D is a block diagram of the third decision table shown in FIG. 7C ordered by key type in accordance with at least some embodiments of the present disclosure.

Figure 8:
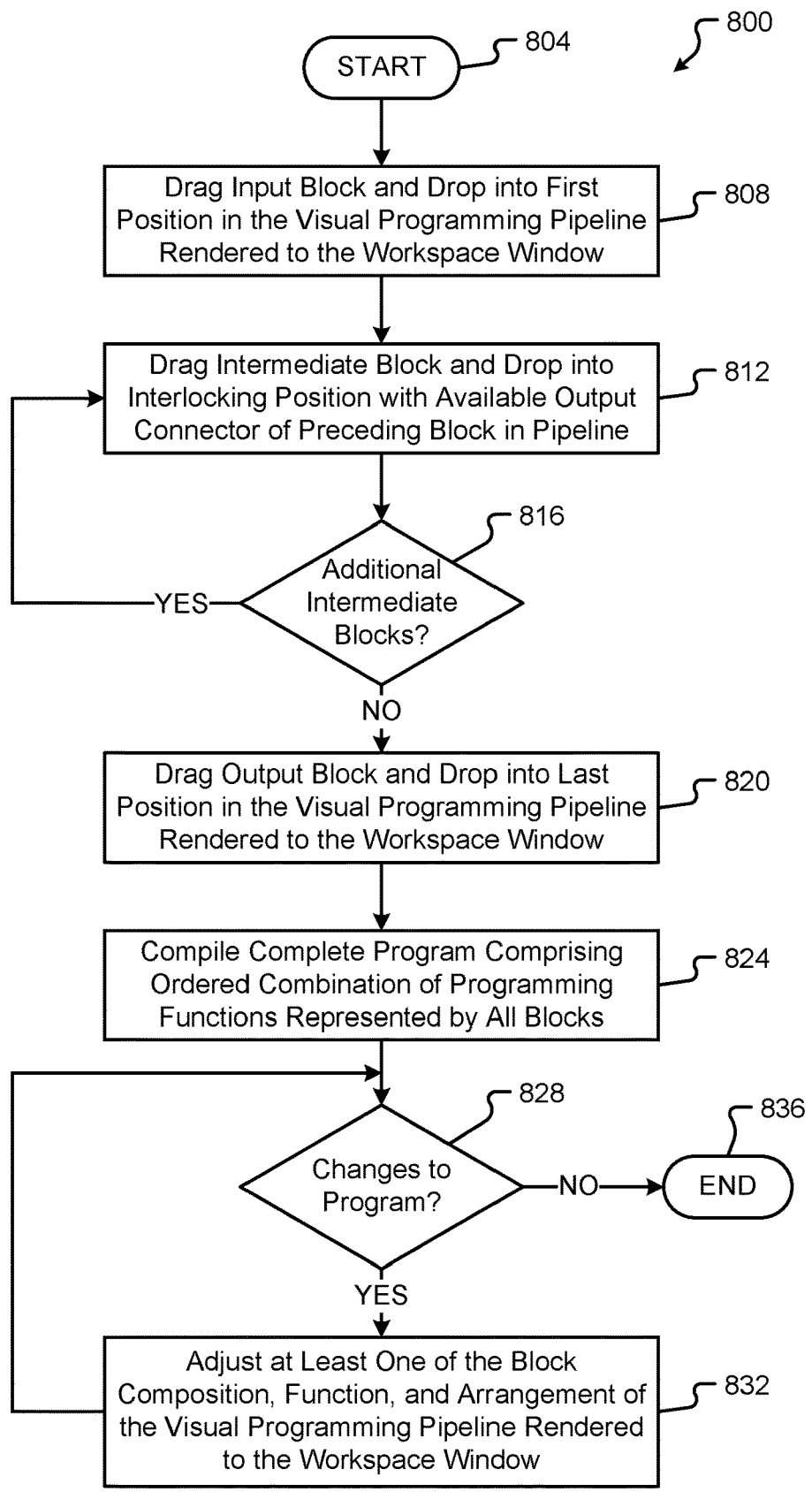
FIG. 8 is a flow diagram depicting a method of creating and compiling a visual interlocking block based program in accordance with at least some embodiments of the present disclosure.

FIG. 8 is a flow diagram depicting a method 800 of creating and compiling a visual interlocking block based program in accordance with at least some embodiments of the present disclosure. The method 800 can be executed as a set of computer-executable instructions (e.g., programming instructions 432, programming instructions 524, etc.) executed by a computer system (e.g., the processor 504 and communication device 408, the processor 424 and collaboration server 412, etc.) and encoded or stored on a computer readable medium (e.g., the memory 428, the memory 508, etc.). Hereinafter, the method 800 shall be explained with reference to the systems, components, modules, applications, software, user interfaces, etc. described in conjunction with FIGS. 1A-7D.

The method 800 begins at step 804 where a user 402A-402N is interacting with a program edit window 604 of a visual interlocking block based programming interface. The program edit window 604 may correspond to the interfaces and presentations described in conjunction with FIGS. 6A-6G. For instance, the program edit window 604 may comprise a single-page layout including an available segments region 620 and a workspace region 616. A plurality of visual program blocks 100A-100B may be rendered to the available segments region 620, from which a user 402A-402N may select a particular block type of the visual program blocks 100A-100B to use in creating, editing, and/or compiling a visual program, or pipeline. In some embodiments, the program edit window 604 may be caused to render to a display device 516 of a communication device 408 via instructions received from a collaboration server 412 running programming instructions 432 for the visual interlocking block based programming methods.

In some embodiments, the program edit window 604 may be rendered as part of a collaborative communication session established between a plurality of client communication devices 408A-408N and the collaboration server 412. In one embodiment, each user 402A-402N in the collaborative communication session may provide input (e.g., via their respective client communication devices 408A-408N) to create, edit, and/or compile a complete program 160 in the program edit window 604.

The method 800 may proceed when a user 402A-402N provides a drag-selection input moving an input block 628 from the available segments region 620 into the workspace region 616 (step 808). The drag-selection input, as provided herein, may correspond to a combination of inputs where a user 402A-402N selects a block 100A-100B from the available segments region 620, drags the block 100A-100B across the region divider 622, and drops the block 100A-100B in a position in the workspace region 616. When the user interface 502 is a touchscreen, this input may correspond to a continuous movement input where a user 402A-402N touches a block (selecting the block 100A-100B) in the available segments region 620 and, without lifting the touch input, drags the touched block 100A-100B over the region divider 622 into the workspace region 616. When the user lifts the touch input (e.g., provided by a stylus, finger, etc.) the block 100A-100B drops into position in the workspace region 616. The first input block 628 dropped into the pipeline and workspace region 616 corresponds to the input block 170A in the first position, or level, of the pipeline and visual program. The first placed input block 628' in the workspace region 616 serves as the start of the visual program. In some embodiments, this input starting the visual program pipeline, and visual program, may be referred to herein as a program-initiation input.

Next, the method 800 continues by dragging a first intermediate block from the available segments region 620 into the workspace region 616 and connecting the first intermediate block 170B with the first placed input block 628' in the pipeline (step 812). This input may be referred to herein as a program-building input. As provided herein the first intermediate block 170B in the pipeline may be in the second position and may define a first processing or routing of inputs received from the first placed input block 628'. The intermediate blocks 170B may be selected from any number of suitable intermediate blocks 170B rendered, or otherwise accessible, in the available segments region 620 of the program edit window 604. A suitable intermediate block 170B, or combination of intermediate blocks 170B, may comprise a matching number of input connection recess(es) 108 to available output connection tab(s) 112 in the pipeline.

The method 800 may proceed by further building the operability and functionality of the visual program by determining whether to include additional intermediate blocks 170B in the pipeline (step 816). In some embodiments, this further building may comprise moving additional intermediate blocks 170B (e.g., via one or more program-building inputs, etc.) into the pipeline and returning to step 812 for each additional intermediate block 170B included. Each additional intermediate block 170B may be interlocked, or connected, to a preceding block 100A-100B (e.g., a preceding intermediate block 170B) in the pipeline illustrated in the workspace region 616. In some embodiments, an intermediate block 170B may be placed between two adjacent and connected blocks in the pipeline. For example, a user 402A-402N, after a drag input, may hover an additional intermediate block 170B at a connection area between the two adjacent connected blocks 100A-100B in the pipeline. In one embodiment, the lower block of the adjacent connected blocks 100A-100B may automatically move, or shift, lower in the pipeline to make room for the additional intermediate block 170B. When dropped in place, the input connection recess 108 of the additional intermediate block 170B automatically interlocks with the upper block of the adjacent connected blocks 100A-100B and the output connection tab 112 of the additional intermediate block 170B automatically interlocks with the lower block of the adjacent connected blocks 100A-100B. The method 800 may continue to loop between steps 816 and 812 until a determined functionality for the visual program is compiled.

Once the functionality of the visual program is created, the method 800 may continue by adding a closing output block to the pipeline (step 820). In some embodiments, the output block may be added by a user 402A-402N dragging an output block from the available segments region 620 across the region divider 622 and into the workspace region 616 at the end of the visual program shown in the pipeline. In some embodiments, this movement input may correspond to a program-closing input provided by one or more of the users 402A-402N. When placed in the last, or lowermost, position of the pipeline, the output block automatically connects to the output connection tab of a preceding intermediate block becoming a connected output block 656'.

In some embodiments, as blocks are dragged from the available segments region 620 and dropped into the workspace region 616, the dropped visual program blocks may automatically interlock with an available output connection tab in the pipeline. For instance, a user 402A-402N may simply drag a block from the available segments region 620 into the workspace region 616 and, when the block is dropped, the block may automatically dock with an unconnected, or open, output connection tab.

When an output block is placed in the last position, or level, of the pipeline, the method 800 may compile a complete program 160 comprising the ordered combination, and/or sequence, of visual program blocks 100A-100B in the pipeline (step 824). Once completed, the complete program 160 may process one or inputs through the ordered sequence of visual program blocks and provide a program output. The complete program 160 may be saved, or stored, to a memory location of a memory storage device.

In some embodiments, the method 800 may end at step 836, or continue in the event that changes to the visual program are determined (step 828). Changes may comprise any number of alterations to the composition, arrangement, or sequence, of visual program blocks 100A-100B in the complete program 160 and/or a functionality of one or more visual program blocks 100A-100B in the complete program 160. In some embodiments, determining to make one or more changes to the visual program blocks 100A-100B in the pipeline may be made before a complete program 160 is compiled.

Changing the visual program may comprise adjusting at least one of the block composition, functionality, and/or the arrangement of the visual program blocks 100A-100B in the pipeline (e.g., rendered to the program edit window 604) (step 832). In some embodiments, a user 402A-402N may determine to change a specific programming function, version, and/or behavior of a visual program block 100A-100B in the pipeline. For instance, a user 402A-402N may make this change by selecting one of a list of functions using the menu selection icon of the specific programming function name 124 of a particular visual program blocks 100A-100B. In some embodiments, as a visual program blocks 100A-100B is dropped into the workspace region 616, a user 402A-402N may be prompted to select a function, or behavior, using the menu selection icon of the specific programming function name 124 of a particular visual program blocks 100A-100B. In one embodiment, the behavior of any visual program block 100A-100B in a pipeline can be changed at any time (e.g., during creation of the visual program, after dropping a visual program blocks 100A-100B in the workspace region 616, after creating the complete program, etc.).

In some embodiments, the changes described above in conjunction with step 832 may be made by any of the users 402A-402N in the collaborative communication session. For example, the collaborative communication session hosted by the collaboration server 412 may provide a shared environment (e.g., workspace region 616, available segments region 620, and/or program edit window 604, etc.). The shared environment allows one or more users 402A-402N to add visual program blocks 100A-100B to the workspace region 616 (e.g., from the available segments region 620, etc.), move visual program blocks 100A-100B within the workspace region 616, remove visual program blocks 100A-100B from the pipeline in the workspace region 616, etc. In some embodiments, the shared environment may allow one or more of the users 402A-402N to alter a specific programming function, version, and/or behavior of a visual program block 100A-100B in the pipeline, as provided above. Among other things, this collaborative creation and/or adjustment of a visual program, allows users 402A-402N to work together in forming a complete program 160 regardless of the geographical location of each of the users 402A-402N. In one example, the users 402A-402N may each have control of elements in the program edit window 604, via their respective client communication devices 408A-408N, to manipulate the visual program blocks 100A-100B in the available segments region 620, workspace region 616, etc. In some embodiments, each of the users 402A-402N may be represented by video images displayed in the collaborative user bar 624 rendered to the program edit window 604. As users 402A-402N are creating or editing a visual program together, they may simultaneously communicate with one another via the collaborative user bar 624.

Any of the steps, functions, and operations discussed herein can be performed continuously and automatically.

The exemplary systems and methods of this disclosure have been described in relation to communication devices, collaborative communication sessions, and communication systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein. For instance, while described in conjunction with client-server networks (e.g., collaboration servers, client devices, etc.), it should be appreciated that the components, systems, and/or methods described herein may be employed as part of a peer-to-peer network or other network. As can be appreciated, in a peer-to-peer network, the various components or systems described in conjunction with the communication system may be part of one or more endpoints, or computers, participating in the peer-to-peer network.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a Private Branch Exchange ("PBX") and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present disclosure include a visual interlocking block based programming system, comprising: a processor; and a memory coupled to and readable by the processor and storing therein instructions that, when executed by the processor, cause the processor to: provide a plurality of visual program blocks, to be rendered by a display device, in an available segments region of a program edit window, wherein each visual program block in the plurality of visual program blocks defines a respective specific programming function, wherein each visual program block comprises an outer shape enclosing a defined area, and wherein the outer shape comprises at least one interlocking block connection comprising at least one of an input connection recess disposed along an upper edge of the outer shape and an output connection tab protruding from a lower edge of the outer shape; receive an ordered sequence of visual program blocks moved from the available segments region into a workspace region of the program edit window, the ordered sequence of visual program blocks comprising an input block arranged in a first position, an output block arranged in a second position, and at least one intermediate block arranged in an intermediate position disposed between the first position and the second position; and compile, when each visual program block of the ordered sequence of visual program blocks are connected to one another in the program edit window at immediately adjacent interlocking block connections, a complete program comprising an ordered combination of functions corresponding to each specific programming function associated with each visual program block that processes one or inputs through the ordered sequence of visual program blocks and provides a program output.

Aspects of the above visual interlocking block based programming system includes wherein receiving the ordered sequence of the visual program blocks further comprises instructions that, when executed by the processor, cause the processor to: receive a first drag selection input moving the input block of the plurality of visual program blocks from the available segments region into the first position of the workspace region, wherein the specific programming function associated with the input block corresponds to receiving an input from at least one source, wherein the input block comprises a first output connection tab protruding from the lower edge of the outer shape of the input block; and receive a second drag selection input moving a first intermediate block of the plurality of visual program blocks from the available segments region into the intermediate position of the workspace region, wherein the first intermediate block comprises a first input connection recess disposed along the upper edge of the outer shape of the first intermediate block and a second output connection tab protruding from the lower edge of the outer shape of the first intermediate block. Aspects of the above visual interlocking block based programming system includes wherein prior to compiling the complete program the instructions, when executed by the processor, further cause the processor to: connect the first input connection recess with the first output connection tab such that the lower edge of the input block contacts the upper edge of the first intermediate block; receive a third drag selection input moving the output block of the plurality of visual program blocks from the available segments region into the third position of the workspace region, wherein the output block comprises a second input connection recess disposed along the upper edge of the outer shape of the output block; and connect the second output connection tab with the second input connection recess such that the lower edge of the first intermediate block contacts the upper edge of the output block. Aspects of the above visual interlocking block based programming system includes wherein the plurality of visual program blocks in the available segments region comprises a pump block comprising a single input connection recess disposed along the upper edge of the outer shape of the pump block and a single output connection tab protruding from the lower edge of the outer shape of the pump block, wherein the specific programming function of the pump block is to receive input data from a visual program block connected to the single input connection recess and pass the input data received to an immediately adjacent block connected to the single output connection tab without altering the input data. Aspects of the above visual interlocking block based programming system includes wherein the plurality of visual program blocks in the available segments region comprises a splice block comprising a two input connection recesses disposed along the upper edge of the outer shape of the splice block and separated a distance from one another and one output connection tab protruding from the lower edge of the outer shape of the splice block, wherein the specific programming function of the splice block is to receive separate input data from respective individual visual program blocks connected to each of the two input connection recesses of the splice block and combine the separate input data received into single input data and pass the single input data to a next visual program block connected to the one output connection tab of the splice block. Aspects of the above visual interlocking block based programming system includes wherein the plurality of visual program blocks in the available segments region comprises a split block comprising one input connection recess disposed along the upper edge of the outer shape of the split block and two output connection tabs protruding from the lower edge of the outer shape of the split block and separated the distance from one another, wherein the specific programming function of the split block is to receive split input data from a visual program block connected to the single input connection recess of the split block and pass the split input data received to each visual program block connected to the two output connection tabs of the split block. Aspects of the above visual interlocking block based programming system includes wherein the plurality of visual program blocks in the available segments region comprises a custom code block comprising a single input connection recess disposed along the upper edge of the outer shape of the custom code block and a single output connection tab protruding from the lower edge of the outer shape of the custom code block, wherein the specific programming function of the custom code block is to receive input data from a visual program block connected to the single input connection recess of the custom code block, process the input data received from the visual program block connected to the single input connection recess of the custom code block, and pass the processed input data to a visual program block connected to the single output connection tab of the single output connection tab of the custom code block. Aspects of the above visual interlocking block based programming system includes wherein the specific programming function of the output block generates at least one of a uniform resource identifier, an error, and a custom code output. Aspects of the above visual interlocking block based programming system includes wherein each visual program block in the plurality of visual program blocks comprises a program type icon disposed in a left-hand side of the defined area, and wherein the program type icon graphically identifies the specific programming function of each visual program block in the plurality of visual program blocks. Aspects of the above visual interlocking block based programming system includes wherein each visual program block in the plurality of visual program blocks comprises a dropdown menu selectable by an icon disposed in the defined area, wherein the dropdown menu, when selected, displays a list of program options for the specific programming function, and wherein each option in the list of program options alters a behavior of the specific programming function. Aspects of the above visual interlocking block based programming system includes wherein the program edit window is rendered as part of a collaborative communication session established between a plurality of users. Aspects of the above visual interlocking block based programming system includes wherein each user of the plurality of users is provided with a user interface that enables shared control of a movement of one or more of the visual program blocks from the available segments region into the workspace region of the program edit window forming the ordered sequence of visual program blocks. Aspects of the above visual interlocking block based programming system includes wherein the collaborative communication session is hosted by a collaboration server and the program edit window is rendered as part of a browser page available to each user across a wireless communication network. Aspects of the above visual interlocking block based programming system includes wherein, in response compiling the complete program, the instructions, when executed by the processor, further cause the processor to store the complete program to a memory location of a memory storage device.

Embodiments of the present disclosure include a method, comprising: causing a plurality of visual program blocks, to be rendered by a display device, in an available segments region of a program edit window, wherein each visual program block in the plurality of visual program blocks defines a respective specific programming function, wherein each visual program block comprises an outer shape enclosing a defined area, and wherein the outer shape comprises at least one interlocking block connection comprising at least one of an input connection area disposed along an upper edge of the outer shape and an output connection area disposed along a lower edge of the outer shape; receiving, via a processor, an program-initiation input moving an input block of the plurality of visual program blocks from the available segments region into a workspace region of the program edit window; receiving, via the processor, a program-building input moving an intermediate block of the plurality of visual program blocks from the available segments region into the workspace region of the program edit window; and connecting, via the processor when the upper edge of the intermediate block is moved in proximity to the lower edge of the input block, the output connection area of the input block with the input connection area of the intermediate block such that the upper edge of the intermediate block is disposed in a position adjoining the lower edge of the input block, wherein the connection forms a partial program comprising the specific programming function of the input block and the intermediate block, wherein input data provided via the input block is passed to and processed by the intermediate block, and wherein the processed input data is provided from the intermediate block to a subsequent visual program block of the plurality of visual program blocks moved from the available segments region into the workspace region and in connection with the lower edge of the intermediate block.

Aspects of the above method further comprises: receiving, via the processor, a subsequent program-building input moving a subsequent intermediate block of the plurality of visual program blocks from the available segments region into the workspace region of the program edit window; and connecting, via the processor when the upper edge of the subsequent intermediate block is moved in proximity to the lower edge of the intermediate block, the output connection area of the intermediate block with the input connection area of the subsequent intermediate block such that the upper edge of the subsequent intermediate block is disposed in a position adjoining the lower edge of the intermediate block. Aspects of the above method further comprises: receiving, via the processor, a program-closing input moving an output block of the plurality of visual program blocks from the available segments region into the workspace region of the program edit window; and connecting, via the processor when the upper edge of the output block is moved in proximity to the lower edge of the subsequent intermediate block, the output connection area of the subsequent intermediate block with the input connection area of the output block such that the upper edge of the output block is disposed in a position adjoining the lower edge of the subsequent intermediate block; and compiling, via the processor, a complete program comprising an ordered combination of functions corresponding to each specific programming function associated with each visual program block connected in an ordered sequence in the workspace region that processes one or inputs through the ordered sequence and provides a program output. Aspects of the above method include wherein the program edit window is rendered as part of a collaborative communication session established between a plurality of users, and wherein at least one of the program-initiation input, program-building input, subsequent program-building input, and the program-closing input is received from two or more users of the plurality of users interacting with the program edit window in a shared collaborative interface. Aspects of the above method further comprising: storing, via the processor, the complete program in a memory location of a memory storage device, wherein the complete program comprises an arrangement of each visual program block in the ordered sequence and the specific programming functions associated therewith.

Embodiments of the present disclosure include a visual interlocking block based programming system, comprising: a display device; a processor coupled to the display device;

and a memory coupled to and readable by the processor and storing therein instructions that, when executed by the processor, cause the processor to: render, via the display device, a plurality of visual program blocks in a first portion of a program edit window, wherein each visual program block in the plurality of visual program blocks comprises a defined block of programming code, wherein each visual program block comprises a graphical border, and wherein the graphical border comprises at least one interlocking block connection comprising at least one of an input connection region disposed along an upper edge of the graphical border and an output connection region disposed along a lower edge of the graphical border; receive an ordered sequence of visual program blocks moved from the first portion into a second portion of the program edit window, the ordered sequence comprising at least one input block arranged in an uppermost position of the second portion, an output block arranged in a lowermost position of the second portion, and at least one intermediate block arranged in an intermediate position disposed between the uppermost position and the lowermost position, wherein each of the visual program blocks in the second portion are connected to one another via respective interlocking block connections; compile a complete program comprising an ordered combination of each visual program block in the ordered sequence of visual program blocks, wherein the complete program, when executed by a computer, processes an input passed from the input block to the at least one intermediate block and generates an output at the output block, wherein the input is received as a key-value pair and wherein the output is at least one of a uniform resource identifier, error value, and custom output; and store the complete program to a memory location of a memory storage device wherein the stored complete program comprises a graphical representation of an arrangement of each visual program block in the ordered sequence of visual program blocks and the defined blocks of programming code associated therewith identified at least partially by icons arranged inside the graphical border of each visual program block in the ordered sequence of visual program blocks.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJS™ processors, other industry-equivalent processors, and may perform computational functions using any known or future-developed standard, instruction set, libraries, and/or architecture.

What is claimed is:

1. A visual interlocking block based programming system, comprising:
   a processor; and
   a memory coupled to and readable by the processor and storing therein instructions that, when executed by the processor, cause the processor to:
      provide a plurality of visual program blocks, to be rendered by a display device, in an available segments region of a program edit window, wherein each visual program block in the plurality of visual program blocks defines a respective specific programming function, wherein each visual program block comprises an outer shape enclosing a defined area, and wherein the outer shape comprises at least one interlocking block connection comprising at least one of an input connection recess disposed along an upper edge of the outer shape and an output connection tab protruding from a lower edge of the outer shape;
      receive an ordered sequence of visual program blocks moved from the available segments region into a workspace region of the program edit window, the ordered sequence of visual program blocks comprising an input block arranged in a first position, an output block arranged in a second position, and at least one intermediate block arranged in an intermediate position disposed between the first position and the second position, wherein the at least one intermediate block processes input received in a key-value pair form and generates output in the key-value pair form without depending on a common programming language between the ordered sequence of visual program blocks; and
      compile, when each visual program block of the ordered sequence of visual program blocks are connected to one another in the program edit window at immediately adjacent interlocking block connections, a complete program comprising an ordered combination of functions corresponding to each specific programming function associated with each visual program block that processes one or more inputs received in the key-value pair form through the ordered sequence of visual program blocks and provides a program output.

2. The visual interlocking block based programming system of claim 1, wherein receiving the ordered sequence of the visual program blocks further comprises instructions that, when executed by the processor, cause the processor to:
   receive a first drag selection input moving the input block of the plurality of visual program blocks from the available segments region into the first position of the workspace region, wherein the specific programming function associated with the input block corresponds to receiving an input from at least one source, wherein the input block comprises a first output connection tab protruding from the lower edge of the outer shape of the input block; and
   receive a second drag selection input moving a first intermediate block of the plurality of visual program blocks from the available segments region into the intermediate position of the workspace region, wherein the first intermediate block comprises a first input connection recess disposed along the upper edge of the outer shape of the first intermediate block and a second output connection tab protruding from the lower edge of the outer shape of the first intermediate block.

3. The visual interlocking block based programming system of claim 2, wherein prior to compiling the complete program the instructions, when executed by the processor, further cause the processor to:
   connect the first input connection recess with the first output connection tab such that the lower edge of the input block contacts the upper edge of the first intermediate block;
   receive a third drag selection input moving the output block of the plurality of visual program blocks from the available segments region into a third position of the workspace region, wherein the output block comprises a second input connection recess disposed along the upper edge of the outer shape of the output block; and
   connect the second output connection tab with the second input connection recess such that the lower edge of the first intermediate block contacts the upper edge of the output block.

4. The visual interlocking block based programming system of claim 1, wherein the plurality of visual program blocks in the available segments region comprises a pump block comprising a single input connection recess disposed along the upper edge of the outer shape of the pump block and a single output connection tab protruding from the lower edge of the outer shape of the pump block, wherein the specific programming function of the pump block is to receive input data from a visual program block connected to the single input connection recess and pass the input data received to an immediately adjacent block connected to the single output connection tab without altering the input data received.

5. The visual interlocking block based programming system of claim 4, wherein the plurality of visual program blocks in the available segments region comprises a splice block comprising two input connection recesses disposed along the upper edge of the outer shape of the splice block and separated a distance from one another and one output connection tab protruding from the lower edge of the outer shape of the splice block, wherein the specific programming function of the splice block is to receive separate input data from respective individual visual program blocks connected side-by-side to each of the two input connection recesses of the splice block and combine the separate input data received into single input data and pass the single input data to a next visual program block connected to the one output connection tab of the splice block.

6. The visual interlocking block based programming system of claim 5, wherein the plurality of visual program blocks in the available segments region comprises a split block comprising one input connection recess disposed along the upper edge of the outer shape of the split block and two output connection tabs protruding from the lower edge of the outer shape of the split block and separated the distance from one another, wherein the specific programming function of the split block is to receive split input data from a visual program block connected to the single input connection recess of the split block and pass the split input data received to each visual program block connected to the two output connection tabs of the split block.

7. The visual interlocking block based programming system of claim 6, wherein the plurality of visual program blocks in the available segments region comprises a custom code block comprising a single input connection recess disposed along the upper edge of the outer shape of the custom code block and a single output connection tab protruding from the lower edge of the outer shape of the custom code block, wherein the specific programming function of the custom code block is to receive input data from a visual program block connected to the single input connection recess of the custom code block, process the input data received from the visual program block connected to the single input connection recess of the custom code block, and pass the processed input data to a visual program block connected to the single output connection tab of the single output connection tab of the custom code block.

8. The visual interlocking block based programming system of claim 7, wherein the specific programming function of the output block generates at least one of a uniform resource identifier, an error, and a custom code output.

9. The visual interlocking block based programming system of claim 1, wherein each visual program block in the plurality of visual program blocks comprises a program type icon disposed in a left-hand side of the defined area, and wherein the program type icon graphically identifies the specific programming function of each visual program block in the plurality of visual program blocks.

10. The visual interlocking block based programming system of claim 9, wherein each visual program block in the plurality of visual program blocks comprises a dropdown menu selectable by an icon disposed in the defined area, wherein the dropdown menu, when selected, displays a list of program options for the specific programming function, and wherein each option in the list of program options alters a behavior of the specific programming function.

11. The visual interlocking block based programming system of claim 1, wherein the program edit window is rendered as part of a collaborative communication session established between a plurality of users.

12. The visual interlocking block based programming system of claim 11, wherein each user of the plurality of users is provided with a user interface that enables shared control of a movement of one or more of the visual program blocks from the available segments region into the workspace region of the program edit window forming the ordered sequence of visual program blocks.

13. The visual interlocking block based programming system of claim 12, wherein the collaborative communication session is hosted by a collaboration server and the program edit window is rendered as part of a browser page available to each user across a wireless communication network.

14. The visual interlocking block based programming system of claim 1, wherein, in response compiling the complete program, the instructions, when executed by the processor, further cause the processor to store the complete program to a memory location of a memory storage device.

15. A method, comprising:
causing a plurality of visual program blocks, to be rendered by a display device, in an available segments region of a program edit window, wherein each visual program block in the plurality of visual program blocks defines a respective specific programming function, wherein each visual program block comprises an outer shape enclosing a defined area, and wherein the outer shape comprises at least one interlocking block connection comprising at least one of an input connection area disposed along an upper edge of the outer shape and an output connection area disposed along a lower edge of the outer shape;
receiving, via a processor, a program-initiation input moving an input block of the plurality of visual program blocks from the available segments region into a workspace region of the program edit window;
receiving, via the processor, a program-building input moving an intermediate block of the plurality of visual program blocks from the available segments region into the workspace region of the program edit window; and
connecting, via the processor when the upper edge of the intermediate block is moved in proximity to the lower edge of the input block, the output connection area of the input block with the input connection area of the intermediate block such that the upper edge of the intermediate block is disposed in a position adjoining the lower edge of the input block, wherein the connection forms a partial program comprising the specific programming function of the input block and the intermediate block, wherein input data provided via the input block is passed to the intermediate block in a key-value pair form and the provided input data is processed by the intermediate block, and wherein the processed input data is provided in the key-value pair form from the intermediate block to a subsequent visual program block of the plurality of visual program blocks moved from the available segments region into the workspace region and in connection with the lower edge of the intermediate block without depending on a common programming language between the intermediate block and the subsequent visual program block.

16. The method of claim 15, further comprising:
receiving, via the processor, a subsequent program-building input moving a subsequent intermediate block of the plurality of visual program blocks from the available segments region into the workspace region of the program edit window; and
connecting, via the processor when the upper edge of the subsequent intermediate block is moved in proximity to the lower edge of the intermediate block, the output connection area of the intermediate block with the input connection area of the subsequent intermediate block such that the upper edge of the subsequent intermediate block is disposed in a position adjoining the lower edge of the intermediate block.

17. The method of claim 16, further comprising:
receiving, via the processor, a program-closing input moving an output block of the plurality of visual program blocks from the available segments region into the workspace region of the program edit window; and connecting, via the processor when the upper edge of the output block is moved in proximity to the lower edge of the subsequent intermediate block, the output connection area of the subsequent intermediate block with the input connection area of the output block such that the upper edge of the output block is disposed in a position adjoining the lower edge of the subsequent intermediate block; and compiling, via the processor, a complete program comprising an ordered combination of functions corresponding to each specific programming function associated with each visual program block connected in an ordered sequence in the workspace region that processes one or more inputs received in the key-value pair form through the ordered sequence and provides a program output without requiring that each visual program block connected in the ordered sequence be programmed using a same programming language.

18. The method of claim 17, wherein the program edit window is rendered as part of a collaborative communication session established between a plurality of users, and wherein at least one of the program-initiation input, program-building input, subsequent program-building input, and the program-closing input is received from two or more users of the plurality of users interacting with the program edit window in a shared collaborative interface.

19. The method of claim 17, further comprising:
storing, via the processor, the complete program in a memory location of a memory storage device, wherein the complete program comprises an arrangement of each visual program block in the ordered sequence and the specific programming functions associated therewith.

20. A visual interlocking block based programming system, comprising:
a display device;
a processor coupled to the display device; and
a memory coupled to and readable by the processor and storing therein instructions that, when executed by the processor, cause the processor to:
render, via the display device, a plurality of visual program blocks in a first portion of a program edit window, wherein each visual program block in the plurality of visual program blocks comprises a defined block of programming code, wherein each visual program block comprises a graphical border, and wherein the graphical border comprises at least one interlocking block connection comprising at least one of an input connection region disposed along an upper edge of the graphical border and an output connection region disposed along a lower edge of the graphical border;

receive an ordered sequence of visual program blocks moved from the first portion into a second portion of the program edit window, the ordered sequence comprising at least one input block arranged in an uppermost position of the second portion, an output block arranged in a lowermost position of the second portion, and at least one intermediate block arranged in an intermediate position disposed between the uppermost position and the lowermost position, wherein the at least one intermediate block processes input received in a key-value pair form and generates output in the key-value pair form without depending on a common programming language between the ordered sequence of visual program blocks, and wherein each of the visual program blocks in the second portion are connected to one another via respective interlocking block connections;

compile a complete program comprising an ordered combination of each visual program block in the ordered sequence of visual program blocks, wherein the complete program, when executed by a computer, processes an input passed from the input block to the at least one intermediate block and generates an output at the output block, wherein the input is received as a key-value pair and wherein the output is at least one of a uniform resource identifier, error value, and custom output; and store the complete program to a memory location of a memory storage device wherein the stored complete program comprises a graphical representation of an arrangement of each visual program block in the ordered sequence of visual program blocks and the defined blocks of programming code associated therewith identified at least partially by icons arranged inside the graphical border of each visual program block in the ordered sequence of visual program blocks.

* * * * *